(12) United States Patent
Feke et al.

(10) Patent No.: US 6,797,158 B2
(45) Date of Patent: Sep. 28, 2004

(54) METHOD AND APPARATUS FOR ACOUSTICALLY DRIVEN MEDIA FILTRATION

(75) Inventors: Donald L. Feke, Chesterland, OH (US); Sanjay Gupta, Cleveland Heights, OH (US); Zenon Mandralis, Dublin, OH (US)

(73) Assignee: Case Western Reserve University, Cleveland, OH (US)

( * ) Notice: Subject to any disclaimer, the term of this patent is extended or adjusted under 35 U.S.C. 154(b) by 148 days.

(21) Appl. No.: 09/814,975

(22) Filed: Mar. 22, 2001

(65) Prior Publication Data

US 2002/0036173 A1 Mar. 28, 2002

Related U.S. Application Data

(63) Continuation of application No. 08/861,277, filed on May 21, 1997, now Pat. No. 6,221,258.
(60) Provisional application No. 60/019,770, filed on Jun. 14, 1996.

(51) Int. Cl.[7] .............................................. B01D 24/28
(52) U.S. Cl. ..................... 210/97; 210/106; 210/109; 210/111; 210/116; 210/269; 210/280; 210/384; 210/388; 210/407; 210/739; 210/746; 210/748; 210/786; 95/29; 96/389
(58) Field of Search .......................... 210/97, 106, 109, 210/111, 116, 192, 263, 269, 280, 359, 384, 385, 388, 407, 739, 746, 748, 780, 785, 786, 795; 95/29; 96/389; 55/292

(56) References Cited

U.S. PATENT DOCUMENTS

| | | | |
|---|---|---|---|
| 2,417,722 A | 3/1947 | Wolff | |
| 2,907,404 A | * 10/1959 | Mare | ........................... 261/111 |
| 3,002,915 A | 10/1961 | Royder | |
| 3,026,966 A | * 3/1962 | Harald | ........................... 95/29 |
| 3,109,721 A | 11/1963 | Zenner et al. | |
| 3,266,631 A | 8/1966 | Snaper | |
| 3,478,883 A | 11/1969 | Deluca, Jr. | |
| 4,136,035 A | 1/1979 | Bogomolov et al. | |
| 4,253,508 A | * 3/1981 | Bodai et al. | |
| 4,475,921 A | 10/1984 | Barmatz | |
| 4,743,361 A | 5/1988 | Schram | |
| 4,747,920 A | 5/1988 | Muralidhara et al. | |
| 4,753,257 A | 6/1988 | Gabriel et al. | |

(List continued on next page.)

OTHER PUBLICATIONS

Lin et al, "Dielectric Filtration and Separation:General Outlook,"Separation and Purification Methods, 53–72 (1981).

(List continued on next page.)

Primary Examiner—Robert James Popovics
(74) Attorney, Agent, or Firm—Fay, Sharpe, Fagan, Minnich & McKee, LLP

(57) ABSTRACT

A method and apparatus for acoustically enhanced particle separation uses a chamber through which flows a fluid containing particles to be separated. A porous medium is disposed within the chamber. A transducer mounted on one wall of the chamber is powered to impose on the porous medium an acoustic field that is resonant to the chamber when filled with the fluid. Under the influence of the resonant acoustic field, the porous medium is able to trap particles substantially smaller than the average pore size of the medium. When the acoustic field is deactivated, the flowing fluid flushes the trapped particles from the porous medium and regenerates the medium. A collection circuit for harvesting the particles flushed from the porous medium is disclosed. Aluminum mesh, polyester foam, and unconsolidated glass beads are disclosed as porous media.

3 Claims, 18 Drawing Sheets

U.S. PATENT DOCUMENTS

| | | |
|---|---|---|
| 4,759,775 A | 7/1988 | Peterson et al. |
| 4,877,516 A | 10/1989 | Schram |
| 5,062,965 A | 11/1991 | Bernou et al. |
| 5,069,688 A | 12/1991 | Wells |
| 5,085,772 A | 2/1992 | Busch-Sorensen |
| 5,085,783 A | 2/1992 | Feke et al. |
| 5,225,089 A | 7/1993 | Benes et al. |
| 5,386,169 A | 1/1995 | Dubruque |
| 5,626,767 A | 5/1997 | Trampler et al. |
| 5,900,043 A * | 5/1999 | Grandjean et al. ............ 95/29 |
| 6,221,258 B1 * | 4/2001 | Feke et al. ................. 210/748 |

OTHER PUBLICATIONS

Gerber, et al., High Gradient Magnetic Separation, 1–60 (1983).

Tarleton & Wakeman, "Microfiltration Enhancement by Electrical and Ultrasonic Force Fields," Proceedings of the Filtration Society, (1989).

Swamy, et al., "Research Note Acoustic Aids Dewatering," Ultrasonics, (1983).

Ahner et al.,"Piezoelectrically Assisted Ultrafiltration," Separation Science and Technology, pp. 895–908 (1993).

* cited by examiner

METHOD AND APPARATUS FOR ACOUSTICALLY DRIVEN MEDIA FILTRATION

This application is a continuation of U.S. application Ser. No. 08/861,277, filed May 21, 1997, now U.S. Pat. No. 6,221,258, which claims benefit of the filing date of U.S. Provisional Application Ser. No. 60/019,770, filed Jun. 14, 1996.

BACKGROUND OF THE INVENTION

The present invention relates to a method and apparatus for separating particles from a fluid suspension by filtration. In particular, the present invention relates to an acoustically driven method and apparatus for filtering fine particles in a filtering medium having an average pore size substantially larger than the diameters of the particles being filtered. As used herein, the term "particles" encompasses solids, immiscible liquid droplets, gas bubbles, and other types of discrete matter that might be suspended or entrained in a fluid.

Filtration of fluid suspensions containing submillimeter-size particles is of fundamental importance in many chemical and biological processing applications. Conventional separation approaches include physical screening techniques (mechanical sieves, beds of filtration media, or porous membranes in which the fluid passes through pores smaller than the size of the solid particles being collected), gravity-driven methods that accomplish separation based on the difference in densities of the particles and the host fluid (centrifugal and settling techniques), and procedures that involve external fields (such as electrical or magnetic) to enhance the quality or rate of separation based on specific system properties.

Filtration of fine solid particles is often very difficult, however, due to the strong interactions between the solids and their host liquid. In the case of conventional screening methods, high pressure drops or slow processing rates often result from the plugging of membranes or the blocking of pores by the particles. Furthermore, back-flushing of a membrane to regenerate the filtering medium often is difficult due to strong interactions between the particles and the filter substrate itself. Moreover, suspensions of immiscible liquid droplets and gas bubbles typically cannot be filtered, as these types of particles are capable of distortion or splitting to pass through the pores in the filtering medium.

In the past few decades, methods based on the use of ultrasonic standing wave fields have been developed for separation of particles from liquid streams without reliance on filtration media. These methods exploit the density and/or compressibility difference between suspended particles and the host liquid to yield sharp, highly efficient separation of particles using resonant acoustic fields. In the case where a one-dimensional sound field is used, the particles are organized into thin parallel bands separated by a one-half wavelength spacing. The particles then are separated from their host fluid by placing closely spaced physical barriers between the bands of particles, transporting particles in the opposite direction of the flowing host liquid by using pseudo-standing waves, or relying on gravity to settle the swarms of particles organized by the acoustic field. These particle-harvesting techniques, however, can be problematic for practical applications. The first two approaches are difficult to achieve mechanically because of the typical small separation distances involved, and the third technique can be hindered by slow sedimentation rates.

Acoustic fields also have been applied in membrane or sieve filtration processes. In these applications, however, intense ultrasonic fields are used to create vibrations in the filtering medium (or in the cake formed above the medium) for the limited purpose of preventing or reducing clogging. Essentially, these ultrasonic fields are applied to free particles from the filtering medium, not to enhance the medium's filtering efficiency.

The concept of combining a porous filtering medium with an external field to enhance particle separation has proven useful in dielectrophoresis and high-gradient magnetic separation. These methods are limited, however, to particles having certain electrical or magnetic properties and therefore are not suitable for a wide variety of applications.

The present invention is intended to utilize the imposition of an acoustic field to increase the efficiency of a porous filtering medium.

In particular, the present invention is intended to enable a porous medium to collect particles up to three orders of magnitude smaller than its average pore size.

The present invention also is intended to provide an acoustically driven enhanced filtration system that does not rely upon the electrical or magnetic properties of the particles being separated and is capable of successfully filtering liquid droplets and gas bubbles as well as solid particles.

In addition, the present invention is intended to provide a system for harvesting particles and regenerating the filtering medium by alternately activating and deactivating an acoustic field imposed on a porous filtering medium.

Additional advantages of the present invention will be set forth in part in the description that follows, and in part will be obvious from that description or can be learned by practice of the invention. The advantages of the invention can be realized and obtained by the method and apparatus particularly pointed out in the appended claims.

SUMMARY OF THE INVENTION

To overcome the problems of the prior art filtration processes, and in accordance with the purpose of the invention, as embodied and broadly described herein, the method of this invention for separating particles from a fluid comprises flowing a fluid containing the particles through a porous medium while imposing an acoustic field on the porous medium. Preferably, the porous medium is disposed in a chamber, and the acoustic field has a frequency resonant to the chamber filled with the fluid.

In a more specific embodiment, the method of this invention for separating particles from a fluid comprises the steps of providing a porous medium within a chamber, the porous medium having a predetermined average pore size; supplying the chamber with a fluid containing the particles and causing the fluid to flow through the porous medium and out of the chamber; and imposing an acoustic field on the porous medium, the acoustic field causing the porous medium to trap particles having a nominal diameter substantially less than the predetermined average pore size of the porous medium.

The method of this invention also can be used to "harvest" particles from a fluid by flowing a fluid containing the particles through a porous medium while imposing an acoustic field on the porous medium, the acoustic field causing the porous medium to trap particles; removing the acoustic field from the porous medium, the removal of the acoustic field permitting particles trapped in the porous medium to pass through the porous medium with the flowing fluid; and collecting the particles passing through the porous medium after the acoustic field is removed.

In accordance with another aspect of the invention, the apparatus of the invention is for separating particles from a fluid and comprises a chamber; a porous medium disposed within the chamber; means for flowing a fluid containing particles through the chamber and the porous medium; and means for imposing on the porous medium an acoustic field causing the porous medium to trap particles. The porous medium preferably is either a mesh or foam filter or a plurality of contacting solids. The imposing means preferably generates an acoustic field having a frequency resonant to the chamber filled with the fluid but without the porous medium.

The accompanying drawings, which are incorporated in and which constitute a part of this specification, illustrate at least one embodiment of the invention and, together with the description, explain the principles of the invention.

DESCRIPTION OF THE PREFERRED EMBODIMENTS

Reference now will be made in detail to the presently preferred embodiments of the invention, examples of which are illustrated in the accompanying drawings.

Figure 1:
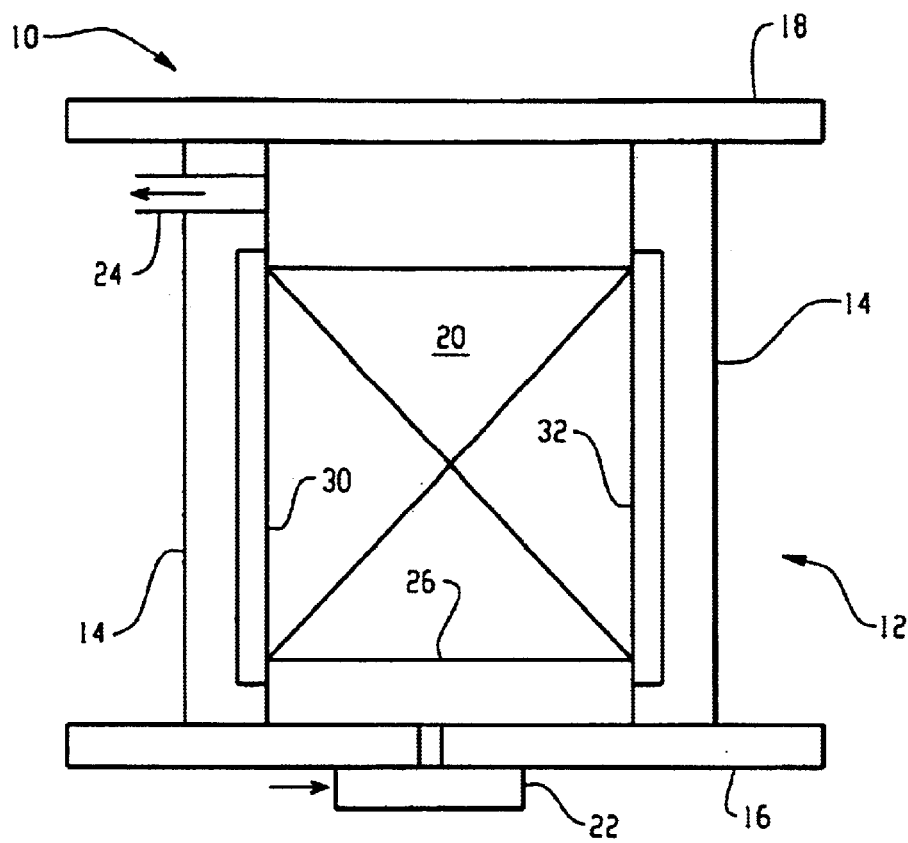
FIG. 1 is a schematic side view of the apparatus of the invention as used to perform the method of the invention.

One embodiment of the apparatus of the present invention is shown in FIG. 1. The filtering apparatus, designated generally by reference numeral 10, is intended to separate from a host fluid stream particles having an average diameter of about 20 μm. The apparatus of the invention includes chamber 12, which preferably is rectilinear with side walls 14 (only two of which are shown), bottom wall 16, and top wall 18. Disposed within chamber 12 is a porous medium 20 having a predetermined average pore size. Porous medium 20 preferably comprises a conventional aluminum mesh or polyester foam filter or unconsolidated millimeter-scale spherical glass beads.

Chamber 12 also is provided with means for flowing a fluid containing particles through the chamber and the porous medium. As embodied herein and as shown in FIG. 1, the fluid-flowing means includes fluid inlet 22 and fluid outlet 24. As will be appreciated by one skilled in the art, the fluid-flowing means also would include a feed pump or gravity-feed arrangement (not shown) and a conduit (not shown) connecting the feed pump to inlet 22. Preferably, interposed between fluid inlet 22 and the interior of chamber 12 is a porous mesh support 26, which aids in distributing the fluid and entrained particles throughout porous medium 20.

In accordance with the invention, filtering apparatus 10 also includes means for imposing on the porous medium an acoustic field causing the porous medium to trap particles from the flowing fluid. As embodied herein and as shown in FIG. 1, the field-imposing means of this invention includes a transducer 30 mounted on the interior face of one side wall 14 and an acoustic reflector 32 mounted on the interior face of the opposite side wall 14. Transducer 30 and reflector 32 can be identical transducers, with only one being energized to impose an acoustic field across porous medium 20. Transducer 30 preferably is driven at a frequency resonant to chamber 12 when the chamber is filled with fluid, and most preferably without the presence of porous medium 20

We have found that, when such a resonant acoustic field is imposed on a porous filtering medium, the porous medium will trap particles having diameters substantially smaller than the average pore size of the porous medium. Particles having nominal diameters up to three orders of magnitude smaller than the pore size are capable of being trapped while the resonant acoustic field is imposed.

Figure 2A:
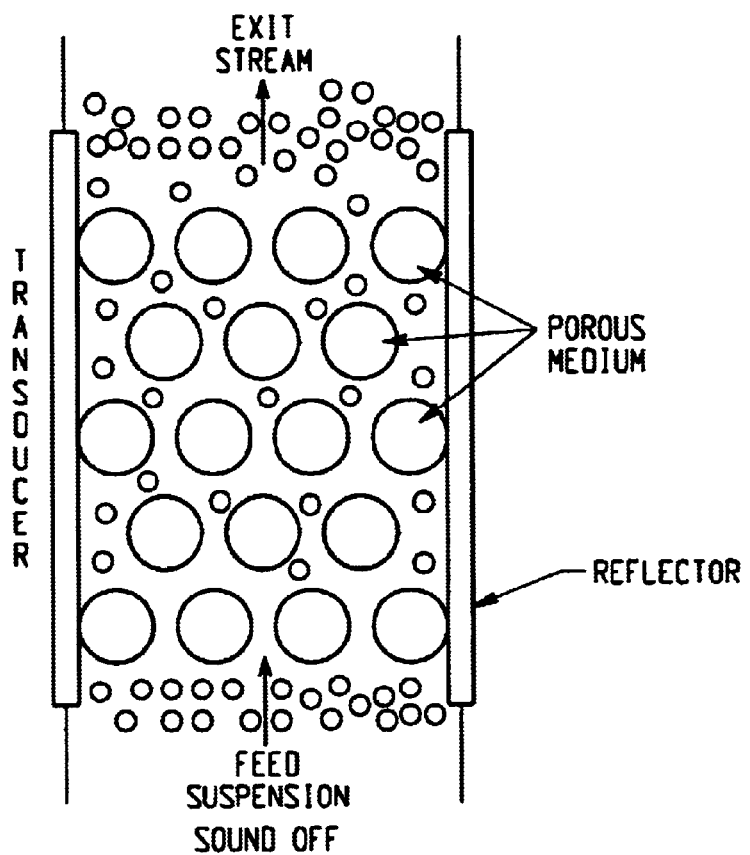
FIGS. 2(a) and 2(b) are schematic diagrams showing the extent of particle filtration in the apparatus of the invention before and during application of the acoustic field on the porous filtering medium.
Figure 2B:
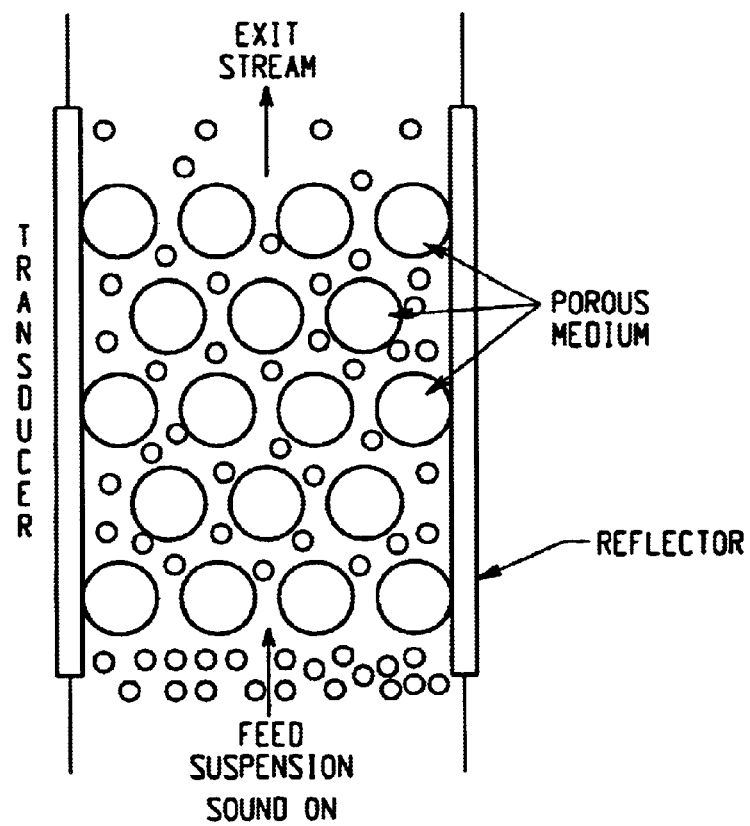

FIGS. 2(a) and 2(b) are schematic illustrations showing the effect of the acoustically enhanced filtering method of the present invention. In FIG. 2(a), the acoustic field is not activated, and the particles suspended in the flowing fluid pass readily through porous medium 20, which has an average pore size substantially larger than the diameters of the particles. When the resonant acoustic field is activated, however, a substantial proportion of the fine particles become trapped within the porous medium, as shown in FIG. 2(a). Subsequent removal of the acoustic field not only halts the trapping of particles fed to the porous medium; it allows the fluid stream to flush out of the porous medium those particles that previously had been trapped by the interaction of the porous medium and the acoustic field, thereby regenerating the porous medium.

A significant advantage of the present invention is that trapping of small particles is accomplished without an accompanying drop in pressure across the porous medium. A major disadvantage of conventional filtration systems, which rely on small pore sizes to trap small-diameter particles, is the substantial drop in pressure across the porous medium as the trapped particles clog the medium. The trapping mechanism of the present invention operates without such clogging.

As will be shown below, the trapping efficiency of the acoustically activated porous medium increases dramatically immediately after the acoustic field is imposed on the chamber, levels off for a period, and then drops steadily until the porous medium is effectively saturated and unable to trap any additional particles. By selectively activating and de-activating the acoustic field, collection of particles can be facilitated. For example, the exit stream can be switched to a collection circuit during deactivation to harvest the formerly acoustically trapped particles.

Figure 3:
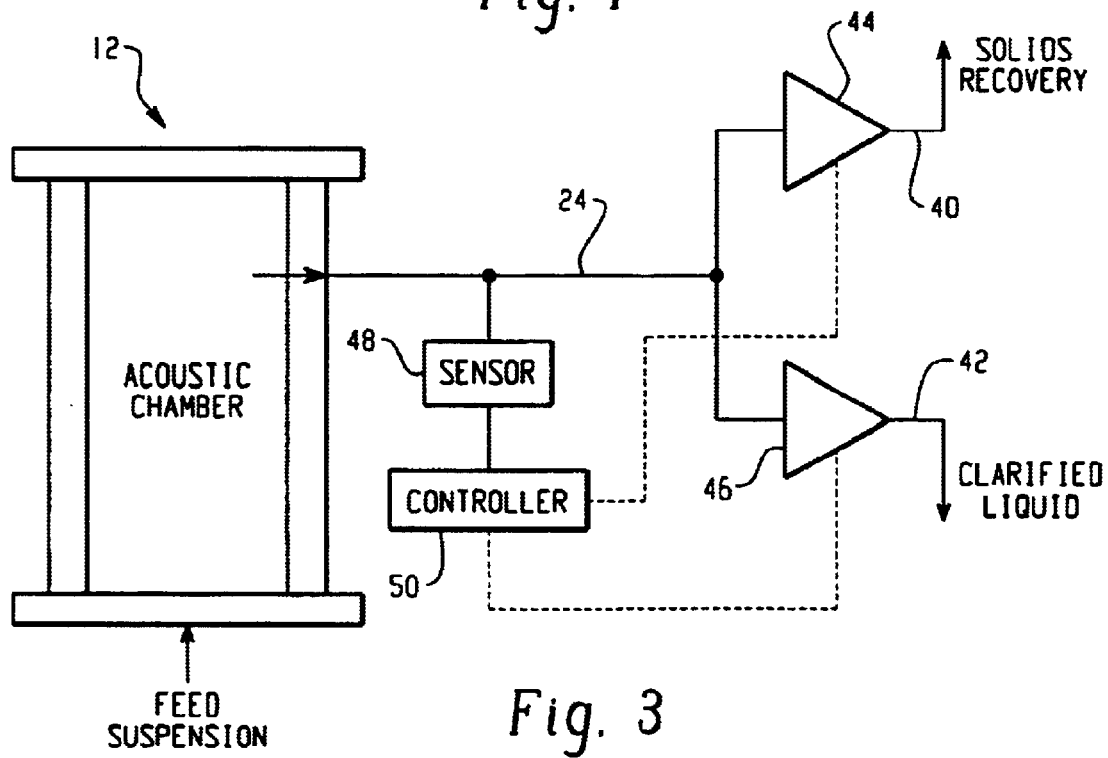
FIG. 3 is a schematic diagram of a particle-harvesting circuit employing the method of the present invention.

One such collection circuit is shown in FIG. 3, in which fluid outlet 24 is split into two branches, one connected to solids recovery conduit 40 and one to clarified liquid conduit 42. The connections to conduits 40 and 42 are provided by valves 44 and 46, respectively. A sensor 48 connected to controller 50 detects the particle concentration in the chamber effluent flowing through outlet 24. Preferably, sensor 48 incorporates a photodetector that measures the amount of light that can pass through the effluent.

During activation of the acoustic field, particles are trapped in the porous medium contained in the chamber, and controller 50 opens valve 46 to permit flow of the clarified effluent from chamber 12 through conduit 42. After the trapping efficiency of chamber 12 peaks, the effluent leaving the chamber contains an increasing concentration of particles. When sensor 48 detects that the particle concentration in outlet 24 has reached a predetermined minimum value corresponding to an optimum trapping condition, the acoustic field is deactivated, and the fluid stream flushes previously trapped particles out of chamber 12. In addition, controller 50 closes valve 46 and opens valve 44 to connect outlet 24 to solids recovery conduit 42.

Numerous variations of the circuit shown in FIG. 3 can be used in practicing the method of this invention. For example, the deactivation of the acoustic field can be accomplished directly by controller 50 or via another controller that receives a signal from sensor 48 that the threshold particle concentration in the effluent has been reached. Moreover, instead of splitting outlet 24 and employing two valves, a single valve can be used to connect outlet 24 to either solids recovery conduit 44 or clarified liquid conduit 46.

Alternatively, trapped particles can be harvested by removing the porous medium from the chamber 12 while the acoustic field is active; the particles trapped in the porous medium would accompany the medium out of the chamber. One possible way of accomplishing medium removal would be to provide the chamber with a hinged wall that can be opened to remove the medium. If unconsolidated glass beads or other solids are used for the medium, the medium and trapped particles can be readily removed from the chamber by gravity if the hinged wall is disposed beneath the medium.

The exact mechanism of particle retention in the porous medium by the method of this invention is still under investigation. Although the propagation of acoustic waves in a fluid-saturated porous medium has been studied extensively, to our knowledge there has been no analysis of the acoustic force experienced by a small particle within the porous medium.

We do know that, when an acoustic chamber is excited at a frequency corresponding to resonance for the chamber, planar ultrasonic waves are propagated within the porous medium through coupling by the liquid portion of the fluid suspension. As depicted in FIG. 2(b), when a fluid containing particles in suspension passes through the chamber, the particles are retained within the porous medium due to the acoustic radiation forces that act. For aqueous suspensions, the acoustic impedance of the liquid ($1.5 \times 10^6$ kg/m²s) is significantly different from two of the types of porous media used in the studies detailed below ($15.0 \times 10^6$ kg/m²s for glass beads, $17.4 \times 10^6$ kg/m²s for aluminum mesh) and only one half that of the third type ($3.0 \times 10^6$ kg/m²s for polyester foam). Therefore, we expect the acoustic field to have a complex structure within the chamber due to scattering from the porous media.

We perceive three possible effects that might give rise to the particle-trapping phenomena we have observed within porous media in a resonant acoustic field. The first relies on primary acoustic forces, the others on secondary acoustic forces.

Figure 4A:
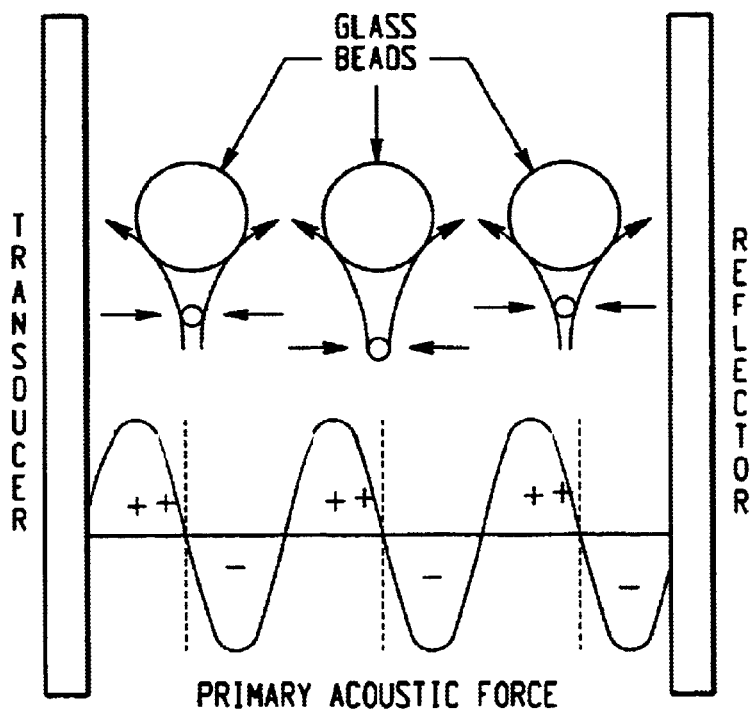
FIGS. 4(a), 4(b), and 4(c) are schematic diagrams illustrating three of theoretical mechanisms by which the method of the present invention traps particles having diameters substantially smaller than the average pore size of the porous filtering medium.

If the porous medium does not strongly interfere with the propagation of the primary sound field, it is reasonable to expect that particle trapping will occur via the primary acoustic force mechanism. In a one-dimensional resonant ultrasonic field, particulate solids (with size much smaller than the acoustic wavelength) suspended in a liquid are known to experience a time-averaged primary acoustic force. For particles with positive acoustic contrast (the case for most solids suspended in water), this primary force causes the particles to collect at pressure nodes of the field. The role of the porous medium thus might be simply to prevent the particles from being entrained by the fluid flow. FIG. 4(a) depicts individual particles moved into positions corresponding to the pressure nodes by the primary acoustic force. As the flow field tries to entrain the particles, their motion (along the flow direction) is blocked by the solid material within the porous medium. Any motion of the particles around the obstruction is resisted by the primary acoustic force, which acts to return them to one of the nodal positions where they again are blocked by the solid material of the porous medium.

Figure 4B:
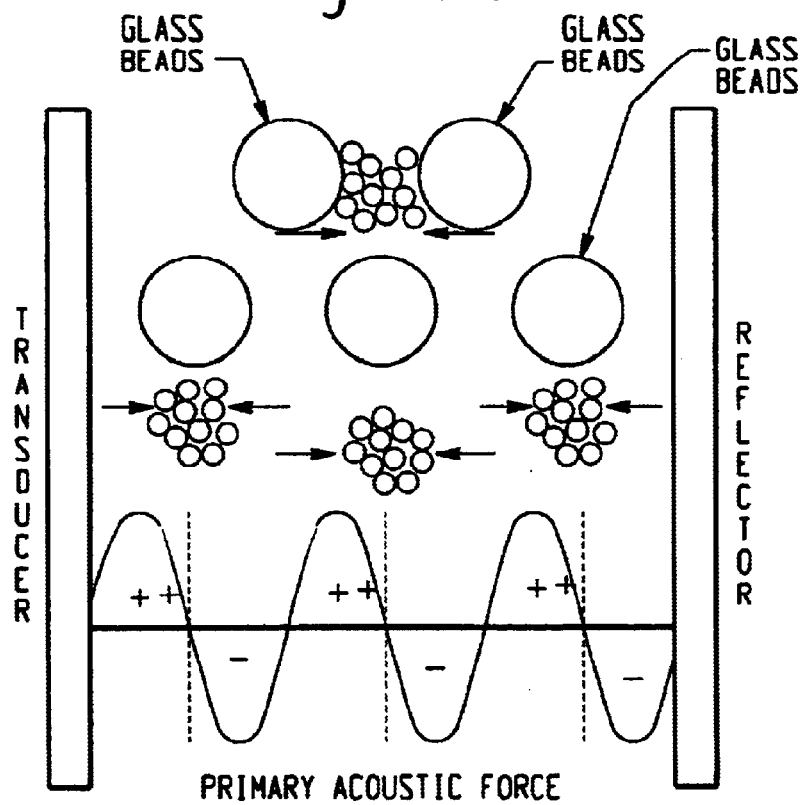
Figure 4C:
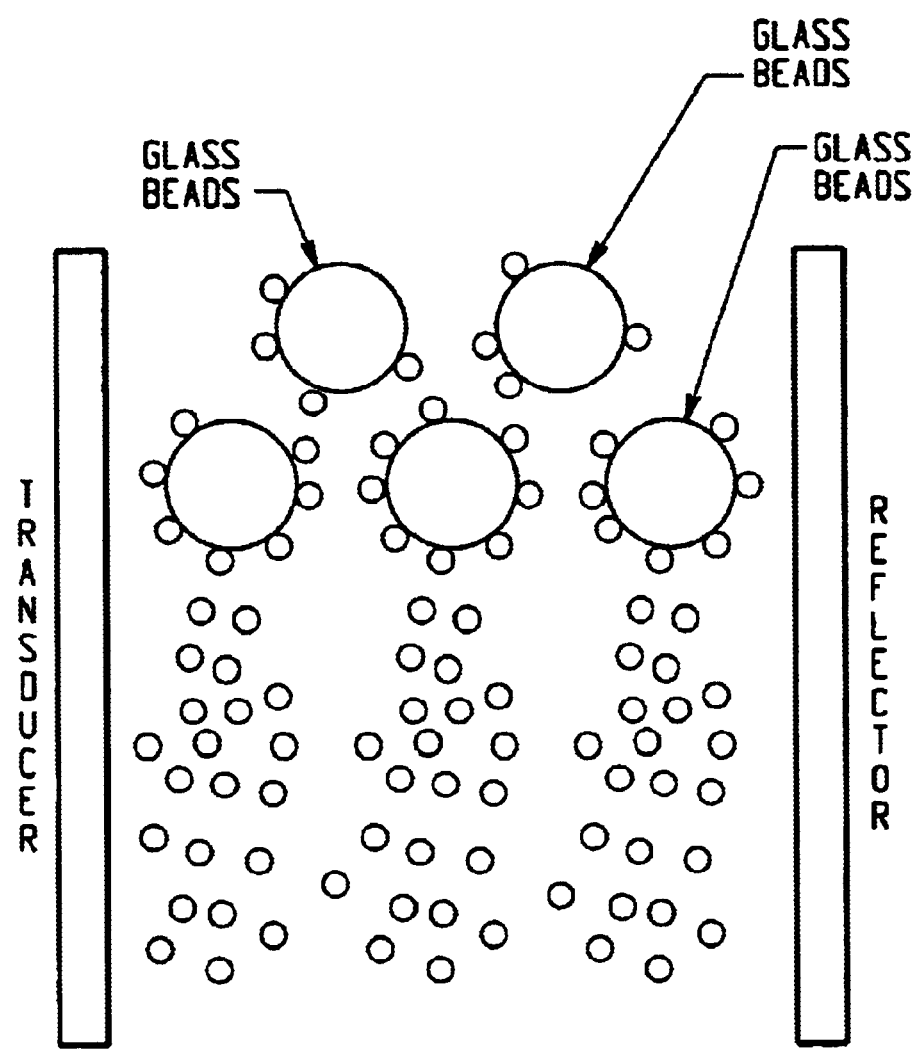

Suspended particles subjected to a resonant acoustic field also experience secondary acoustic forces, which arise due to interactions with the acoustic field scattered by the particles. Secondary forces tend to be attractive between similar particles and also can cause particles to be attracted toward the solids comprising the porous medium. Thus, as shown in FIG. 4(b), secondary forces might form clusters of particles within the porous medium that are larger than the pore size and thus are trapped within the porous medium. Alternatively, as shown in FIG. 4(c), some particles might be so strongly anchored onto the internal surfaces of the porous medium by secondary forces that the fluid flow is not be able to displace them. The secondary forces in turn might cause additional particles to attach onto the anchored particles.

Whatever the mechanism underlying the phenomenon, the efficacy of the present invention is demonstrated by the following examples, all of which utilized a rectilinear acoustic chamber as shown schematically in FIG. 1. The acoustic chamber was fabricated from Plexiglas and included two rectangular lead zirconate titanate transducers (APC Model 880) measuring 76.2 mm×38.1 mm×6.25 mm, with a fundamental resonance frequency of 320 kHz. The transducers were mounted on opposed walls of the chamber so that they were parallel to each other at a 5.8 mm spacing (except where otherwise noted).

Three types of porous media were used to fill the space between the transducer and reflector. For experiments with unconsolidated media, 3 mm diameter solid glass beads (Fisher Scientific, Pittsburgh, Pa.) were used. When randomly packed within the acoustic chamber, the average size of the pores between the glass beads is approximately 300 $\mu$m. Other experiments were done with aluminum mesh (ERG Material and Aerospace Corp., Oakland, Calif.) and polyester foam (Stephenson & Lawyer Inc., Grand Rapids, Mich.) having 10, 20, or 40 pores per inch (ppi). The average pore sizes for the mesh and foam were 2000 $\mu$m for the 10 ppi media, 1000 $\mu$m for the 20 ppi media, and 450 $\mu$m for the 40 ppi media. For all examples described (except otherwise noted), the dimensions of the space filled by the porous medium measured 70 mm high, 35 mm wide, and 5.8 mm thick in the direction of propagation of acoustic field. In all cases, the porous medium was supported on a 17.5 mm high metallic mesh positioned below the acoustically active volume to help the distribution of the fluid flow within the chamber.

The acoustic field was produced by energizing one of the transducers at a frequency of 1.103 MHz using a signal generated by a KROHN-HITE 2100A signal generator and amplified by an ENI 240L power amplifier. The second transducer served as a reflector. The frequency chosen corresponds to one of the resonance frequencies of the acoustic chamber when filled with fluid but in the absence of the porous medium. Electrical power consumption was measured by a Bird Wattmeter Model 4410A.

In determining the resonant frequency of the chamber, we first assembled the chamber and, without adding the porous medium, fed the chamber with a fluid containing particles in suspension. The powered transducer then was energized, and the frequency of the signal generator was adjusted until the particles within the suspension showed the formation of bands within the chamber at the nodal planes of the acoustic field. This phenomenon signaled the resonance condition. We then reassembled the chamber with the porous medium inside and energized the transducer at the same frequency that produced the resonance condition in the absence of the porous medium.

These experiments were performed using aqueous suspensions of 325-mesh polystyrene divinyl benzene particles (average particle diameter about 20 $\mu$m). These particles were suspended in deionized water using Triton X-100 as a surfactant. A peristaltic pump was used to deliver the suspension to the acoustic chamber. A set of three three-way valves incorporated into the flow circuit allowed the feed to the chamber to be smoothly switched to clear water for some of the experiments described below.

Particle concentrations in the suspensions were determined by measuring the percentage light transmittance at 360 nm in a BAUSCH & LOMB Spectronic 20 photometer. The transmittance values were converted to weight percentage solids using a calibration curve determined from measurements on standard suspensions.

Procedures

Feed suspensions of known concentrations of polystyrene particles in water were passed through the chamber at fixed flow rates. The transducer was activated at a preselected power level to produce the resonant acoustic field. Because the densities of polystyrene particles (1.05 g/cm$^3$) and water (1.00 g/cm$^3$) are so close, the effects of gravity were assumed to be insignificant.

Typically, the experiments were conducted by first establishing a flow of the suspension through the chamber while the acoustic field was deactivated. Following activation of the acoustic field, the particle concentration in the exit stream at the top of the chamber was measured at regular intervals of 30–60 seconds. Small samples of effluent (approximately 5 cm$^3$) were collected and immediately analyzed using the photometer to determine the particle concentration exiting the chamber. The elapsed time for each experiment was measured from the instance of activating the acoustic field.

In the experiments designed to quantify the effect of processing variables for the glass-bead and aluminum-mesh media, a sequence of three segments was performed to test different performance features of the method.

Segment I: During the first segment, the suspension of a fixed particle concentration was continuously fed into the chamber and an ultrasonic field of constant frequency and intensity (maintained by constant voltage supplied to the transducer) was maintained. Within less than a minute, the particle concentration in the exit stream typically dropped as particles were retained within the porous medium. Eventually, the porous medium became saturated with particles and their concentration in the exit stream rose.

Segment II: After a preset duration of time, the feed to the chamber was switched to clear water while the acoustic field was maintained. The flow rate of water was equal to that of the suspension feed rate in Segment I. The purpose of Segment II was to determine what fraction of particles, previously retained in the porous medium, could be removed by flushing with clear water while the acoustic field was energized. If the particles were loosely trapped within the porous medium, the water flush could be expected to remove them. Typically, a small fraction of the retained solids were found to be flushed from the chamber by this water flushing. Segment II was continued until the concentration in the exit stream dropped to a low value (typically 0.05 wt %).

Segment III: During this final segment, the acoustic field in the chamber was deactivated while clear water continued to flow through at the same flow rate as in Segment II. The particles still trapped inside the porous medium due to acoustic forces would then be released. The purpose of this segment was to determine the amount of particles retained due to the acoustic effects. Also, it provided some indication of the length of time required to regenerate the porous medium. Typically, following the start of Segment III, the particle concentration in the exit stream is quite high, but then it diminished within a few minutes.

Qualitative Results

In all of the experiments performed, the application of the resonant acoustic field to the porous medium resulted in the retention of particles within the chamber. Within a few seconds of activating the acoustic field, the solids concentration in the effluent stream was visibly diminished in comparison to the feed suspension. In all cases studied, the porous medium was found to entrap the particles (average diameter 20 $\mu$m), even though the pore size was much larger (up to 2000 $\mu$m for the 10 ppi aluminum mesh). No collection was observed if the acoustic chamber was driven at a nonresonant frequency, or if the acoustic field was not energized.

It also became apparent that there was a maximum level of solids that could be retained by the porous media. Visual observation indicated that, after a time, the concentration of solids in the exiting stream increases with continued use, indicating that the solids loading within the porous medium was reaching a saturation condition. It was also clear that the solids could readily be flushed from the porous medium when the sound field was deactivated.

In order to analyze the filtration performance of the method and apparatus of the present invention a series of quantitative experiments were undertaken. These experiments focused on the saturation and flushing phenomena, as well as the relationships between filtration efficiency and operating conditions.

EXAMPLE 1

Figure 5A:
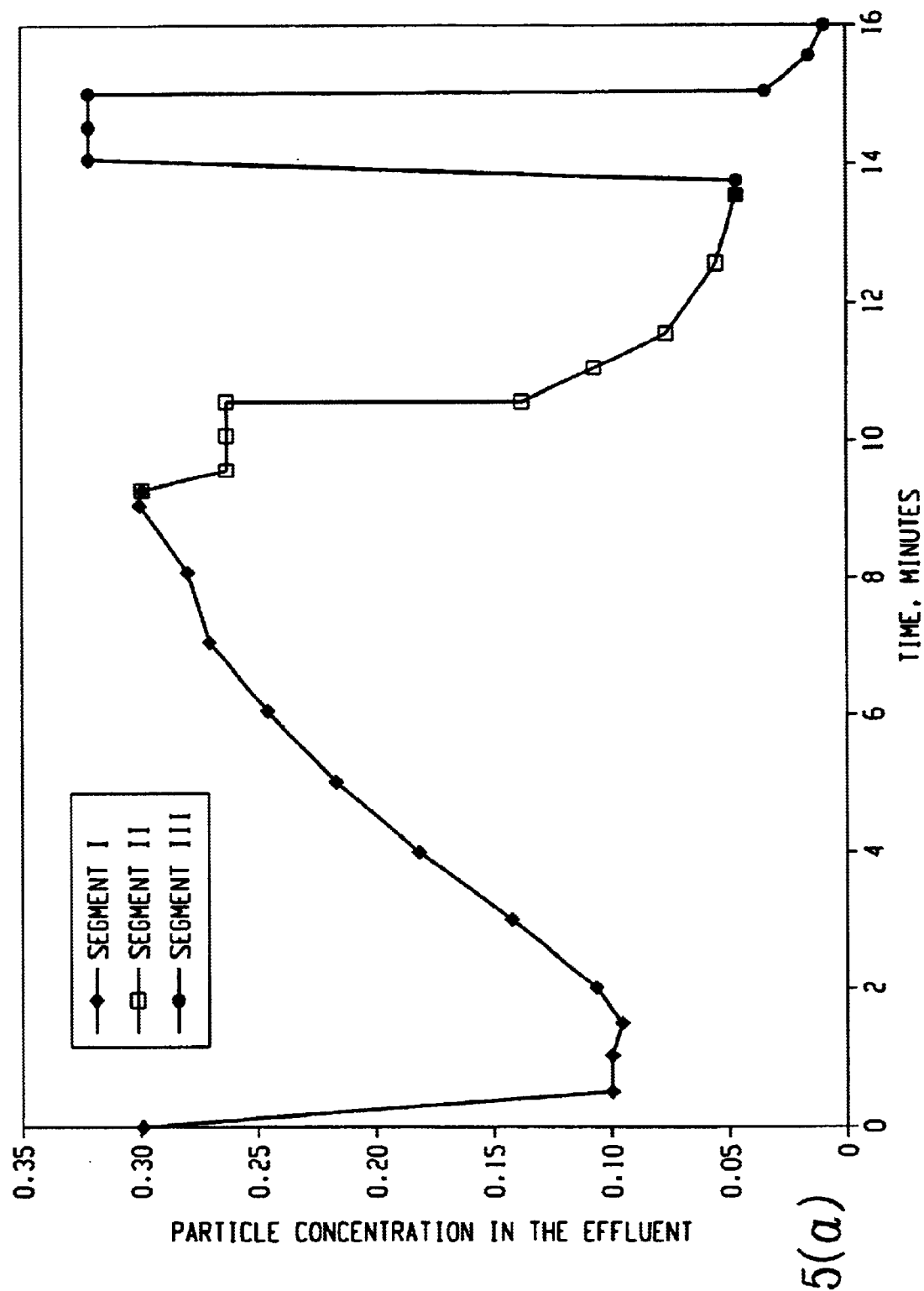
FIG. 5(a) is a graph of particle concentration versus time downstream of the porous filtering medium during one illustrative example of the method of the present invention.

FIG. 5(a) is a graph showing the variation of particle concentration in the exit stream as a function of time for an experiment involving 0.3 wt % suspension fed at 35 cm$^3$/min to the chamber with the transducer operated with 20 W of power. This experiment used the unconsolidated glass beads as the porous medium. In Segment I, the effluent concentration reached a minimum within 1 minute of acoustically energizing the flow field. Thereafter, as the porous medium became saturated, the effluent concentration rose, reaching the original particle concentration after about 9 minutes, indicating the state of full saturation. When clear water was fed in Segment II, the concentration of particles in the effluent dropped over the course of 3 to 4 minutes, but the concentration did not drop to zero. This indicated a continuing leakage of solids from the porous media due to hydrodynamic entrainment. Upon deactivating the field in Segment III, a rapid release of the particles from the chamber was seen. Within a matter of 2 min, the chamber was essentially devoid of particles.

Figure 5B:
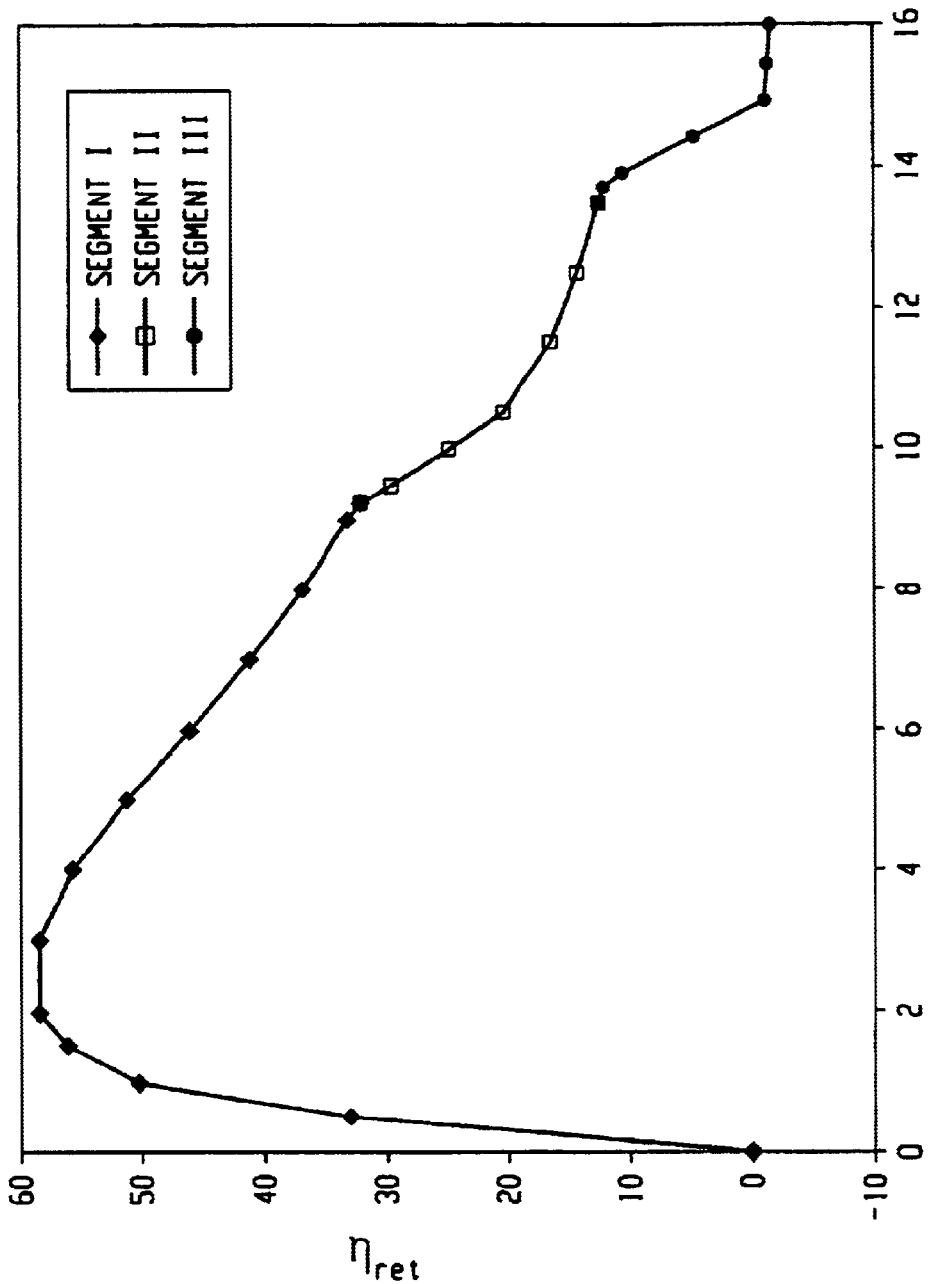
FIG. 5(b) is a graph of particle mass retained in the porous filtering medium as a function of time for the same example of the method of the present invention described in FIG. 4(a)

Corresponding to the results shown in FIG. 5(a), FIG. 5(b) shows the amount of particle mass retained inside the porous medium relative to the total mass of particles fed to the chamber as a function of time. This cumulative retention percentage, $\eta_{ret}$, can be taken as an overall measure of filtration efficiency of the separation method. Values of $\eta_{ret}$ were calculated from the concentration data by the equation $$\eta_{ret} = \frac{\int (C_{out} - C_{in}) \times Qdt}{\int C_{in} \times Qdt} \times 100,$$

where $C_{out}$=particle concentration in the exit stream;
$C_{in}$=particle concentration in the feed stream; and
Q=suspension flow rate.

FIG. 5(b) indicates that, during the first 2 minutes, the retention percentage increases with time, reaching a maximum value of approximately 60%, but drops thereafter. After this peak, the filtration efficiency decreases continuously. By the end of Segment I (9.25 mn), approximately 35% of the total mass fed to the chamber is retained. During Segment II, the percentage retention continues to drop, with only 12% of the fed particles being retained even at the end of Segment II. This does indicate, however, that some particle trapping is due to the effects of the acoustic field. As the acoustic field is turned off at the beginning of Segment III, most of the remaining trapped particles exit the porous medium in a very short time period (indicated by sharp drop in retention percentage). The very small negative value at the end of Segment III is an indication that the material balance on the particles closes quite well.

Experiments were repeated for a range of suspension flow rates, feed concentration, and levels of electrical power supplied to the piezoelectric transducer.

EXAMPLE 2

Figure 6:
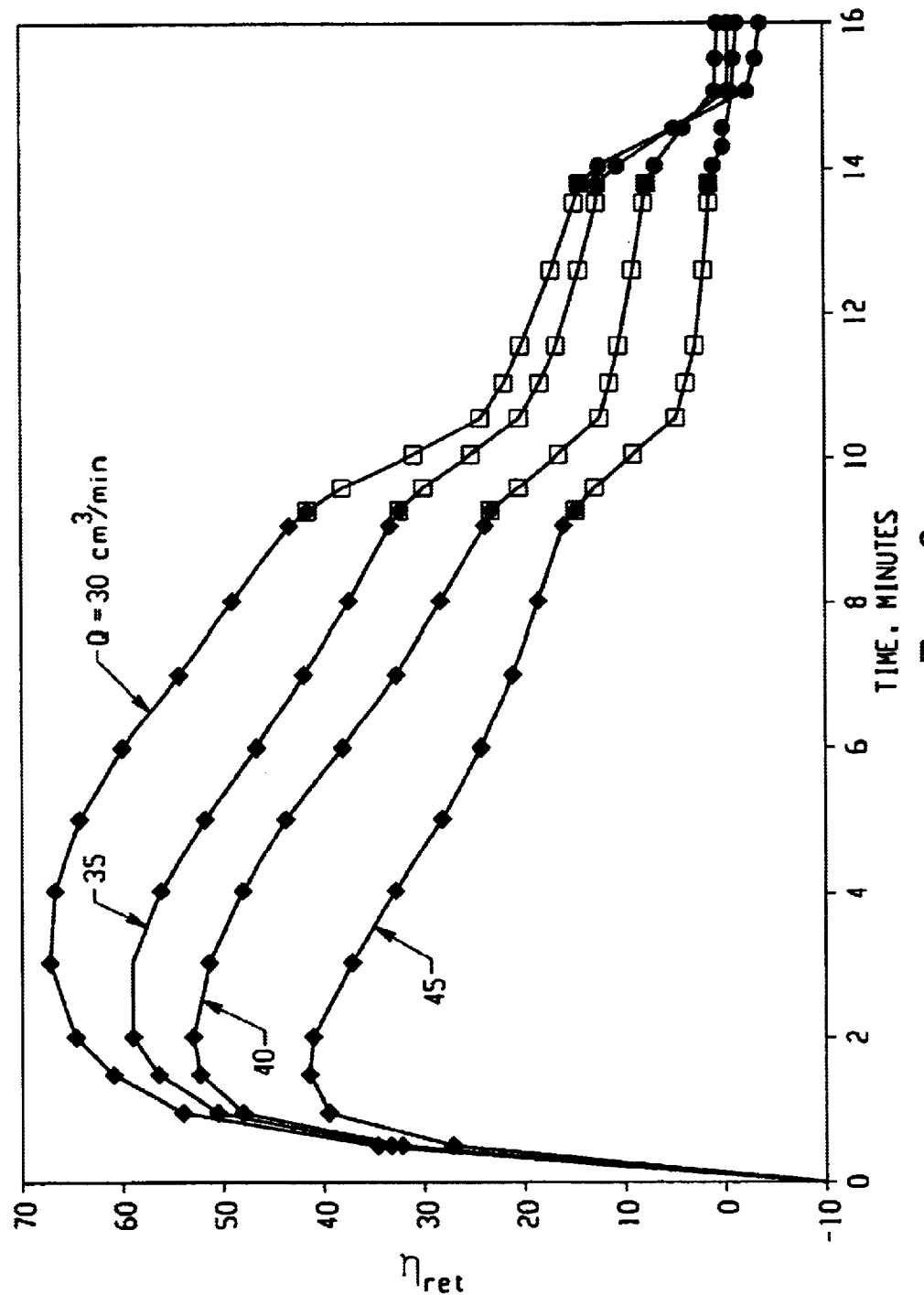
FIGS. 6–17 are graphs of retained particle mass versus time for additional illustrative examples of the method of the present invention.

The effect of suspension flow rate is shown in FIG. 6 for a 0.3 wt % feed concentration through the glass-bead medium and with the transducer operated at 20 W. As the suspension flow rate was increased from 30 to 45 cm³/min, the residence time of the suspension in the porous medium decreased, and therefore one expected to see a decrease in filtration efficiency. FIG. 6 shows that the filtration efficiency was unaffected by the flow rate during initial period, but the time at which the percentage retention reached its peak value and the value of maximum retention decreased with increasing flow rate. The percentage retention for higher flow rates were consistently below those for lower flow rate for the whole duration of Segments I and II.

EXAMPLE 3

Figure 7:
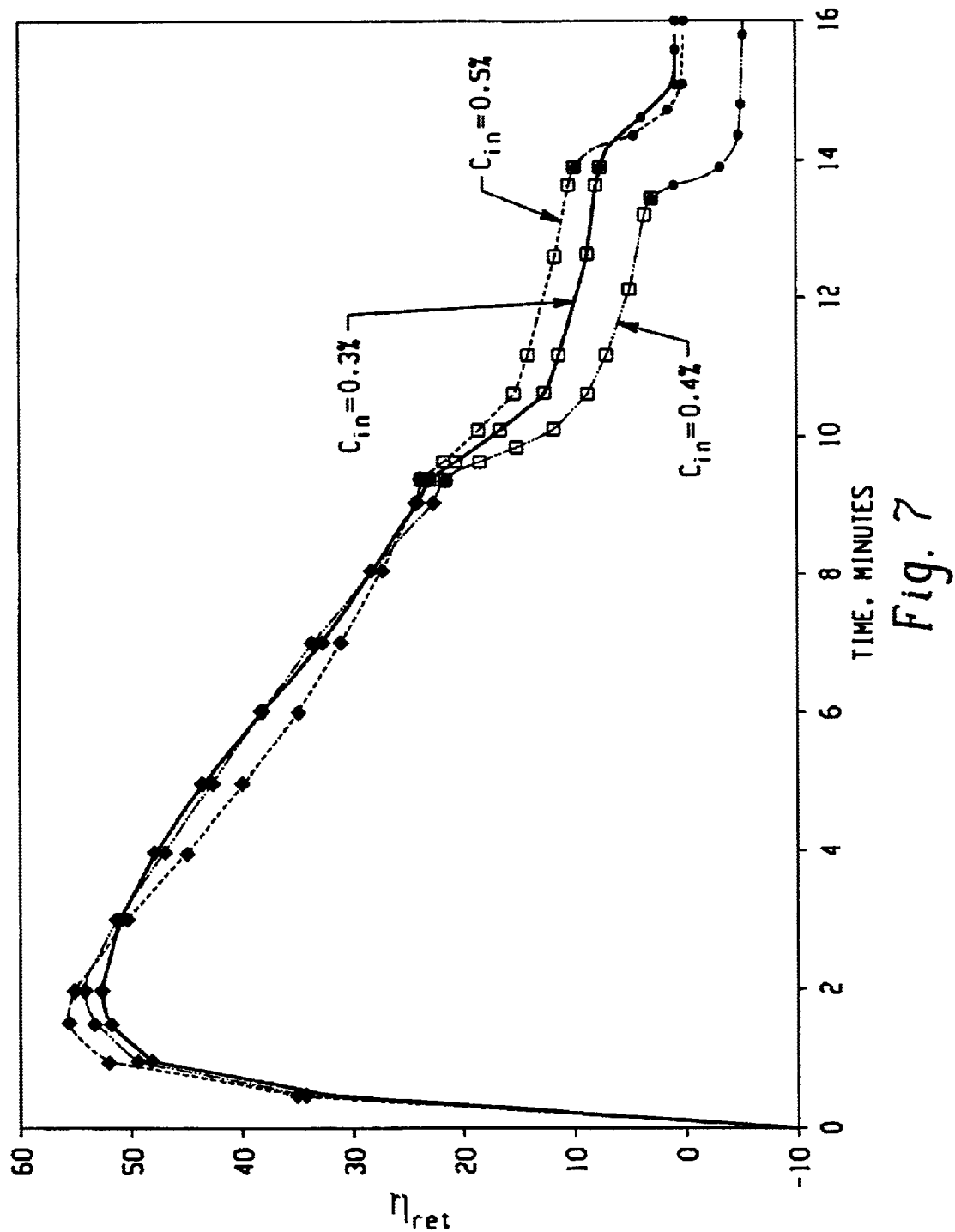

The effect of feed concentration is shown in FIG. 7. For this set of experiments, also using the glass-bead porous medium, the flow rate was fixed at 35 cm³/min, electrical power was 20 W, and feed concentrations of 0.3, 0.4 and 0.5 wt % were used. In Segment I, there was very little variation in percentage retention for the various feed concentrations. Small differences are seen in Segment II, and these differences can probably be attributed to experimental error. These observations indicate that the filtration is not limited by filling of the available pore volume, at least for the range of feed concentrations tested.

EXAMPLE 4

Figure 8:
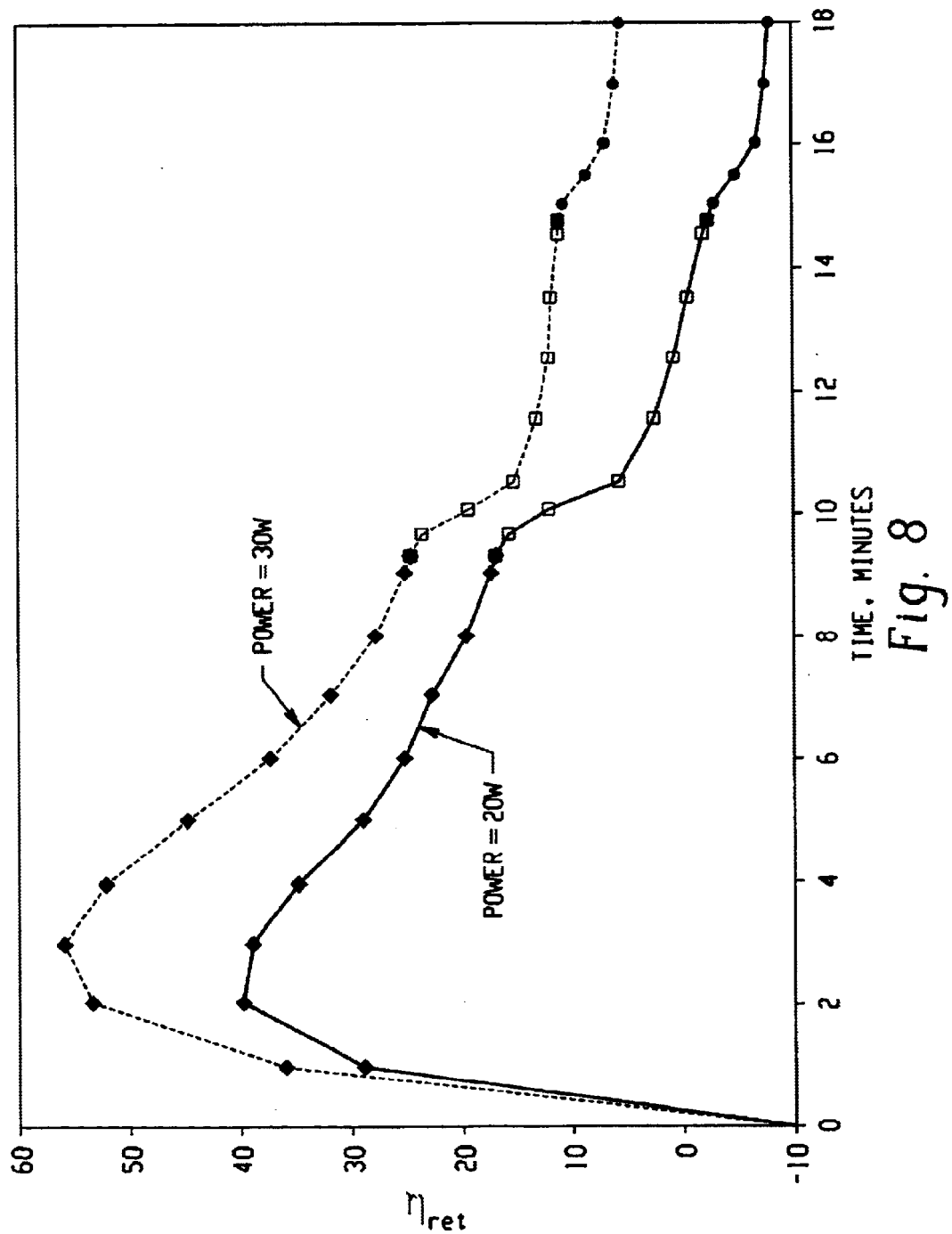

The acoustic field intensity in the chamber is directly related to the electrical power consumed in the piezoelectric transducer. The exact relationship between electrical power consumption and the acoustic field intensity, however, is complex (and usually unknown because of unknown losses in acoustic chamber). Thus, we use the electrical power consumption as a measure of the acoustic intensity. FIG. 8 shows the relationship between electrical power consumption and percentage retention for a fixed feed concentration of 0.2 wt % and a flow rate of 40 cm³/min through the glass-bead porous medium. As can be expected, higher filtration efficiency was observed at higher power levels. Similar experiments were carried out for feed concentrations of 0.4 wt %. In this case, there was an improvement in the filtration efficiency when the power was increased from 20 to 30 W.

EXAMPLE 5

Figure 9:
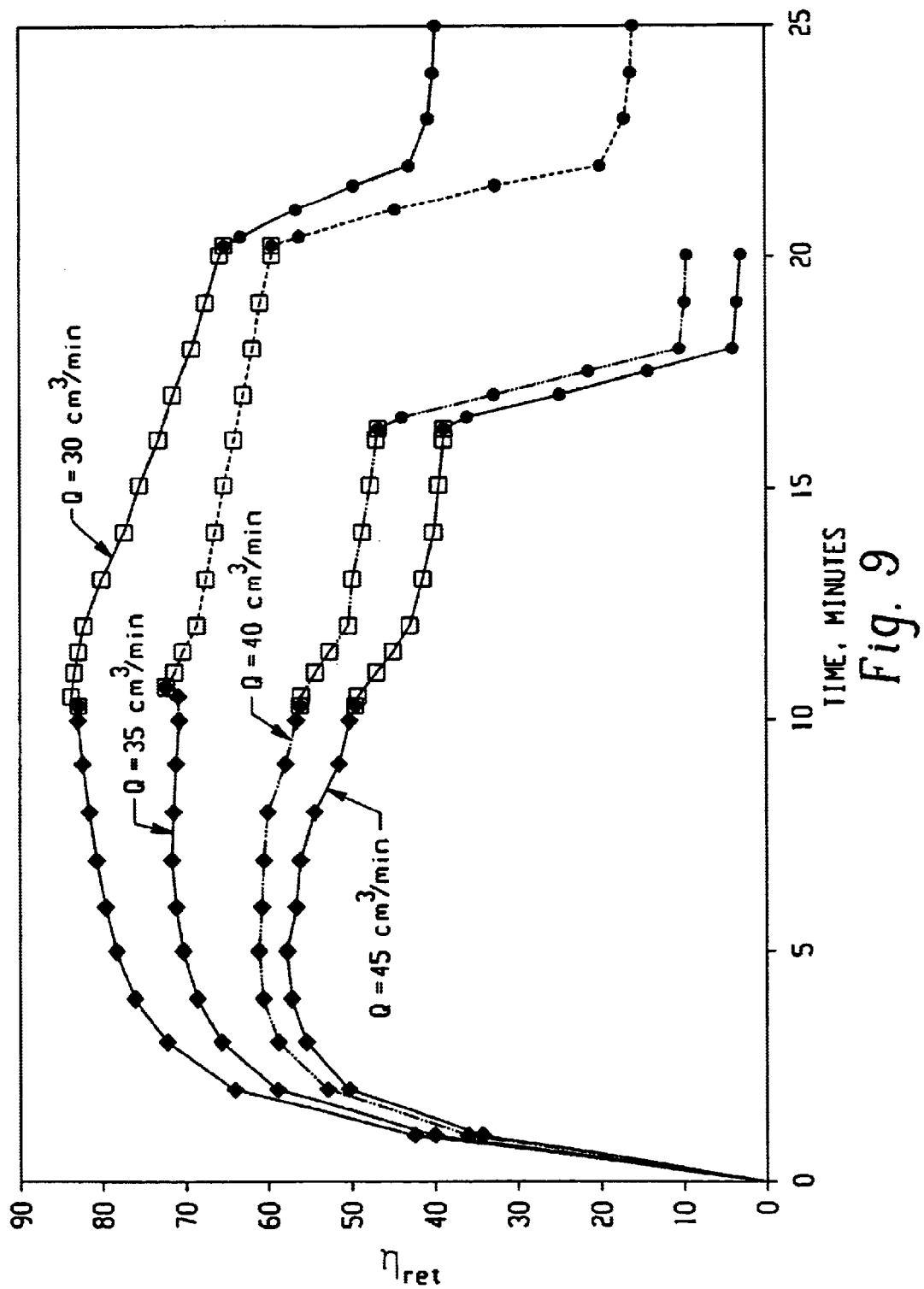

FIG. 9 shows the effect of suspension flow rate on the cumulative filtration efficiency for feeds of 0.3 wt % with the chamber filled with the 10 ppi aluminum-mesh porous medium and the transducer driven with 20 W of power. The percentage retention in both Segments I and II, as well as the time at which percentage retention starts to decrease from its maximum, was significantly higher with the aluminum mesh than with the glass beads. This improvement in filtration efficiency compared to the case of the unconsolidated spheres might be attributable to the higher porosity of the aluminum mesh (92–94% compared to 35% for the glass bead bed). This leads to a slower interstitial velocity inside the porous medium and hence reduced tendency of the carrier fluid to entrain particles.

EXAMPLE 6

Figure 10:
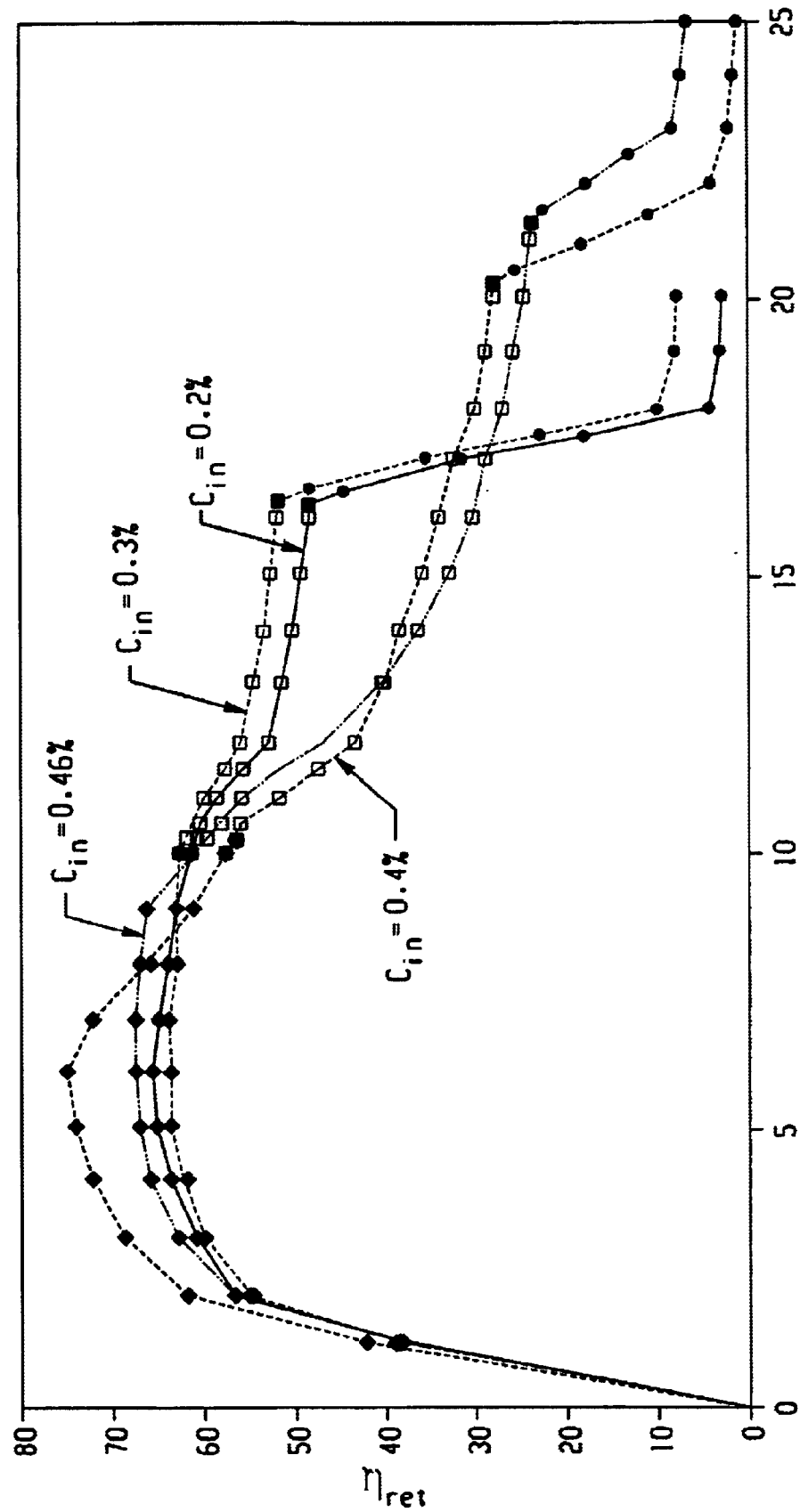

FIG. 10 shows the influence of feed concentration on filtration efficiency for a feed flow rate of 40 cm³/min using a chamber equipped with the 10 ppi aluminum-mesh porous medium and powered at 20 W. During Segment I, there was no significant effect of feed concentration on filtration efficiency, which is similar to the results seen for the case of the unconsolidated-sphere medium. In segment II, however, the percentage retention shows a strong effect of feed concentration in the range from 0.3 to 0.4 wt %. This indicates that the particles retained from the feed with higher concentration were in a configuration more susceptible to entrainment than those particles entrapped from a lower concentration feed. Correspondingly, the configuration of the entrapped particles within the porous medium might be sensitive to the kinetics with which the particles are collected within the porous medium.

EXAMPLE 7

Figure 11:
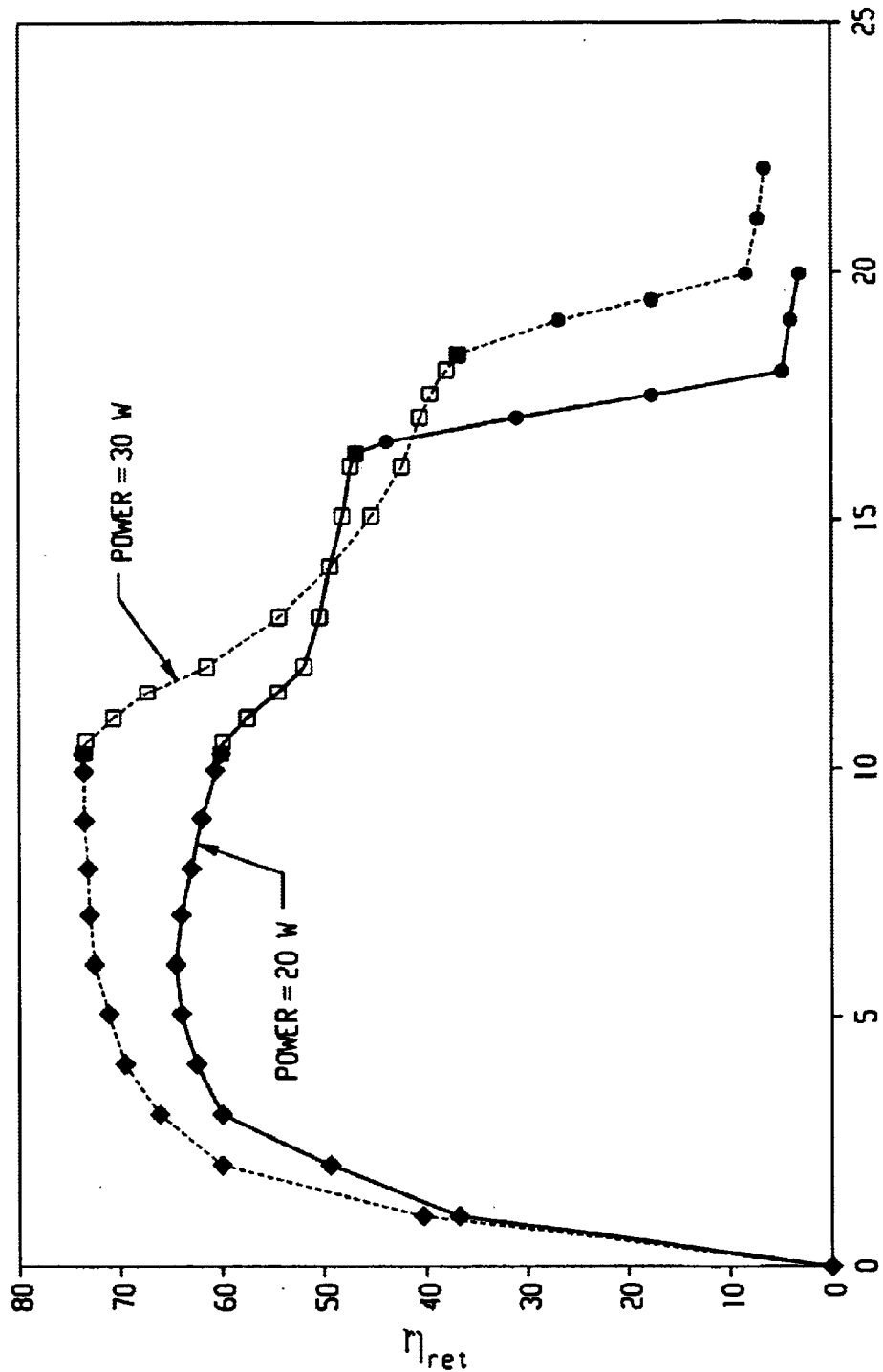

FIG. 11 shows the effect of acoustic field intensity in the acoustic chamber, again expressed in terms of electrical power supplied to the piezoelectric transducer, on the filtration performance. In this case, the chamber was equipped with 10 ppi aluminum mesh, and a 0.2 wt % suspension was fed at 40 cm³/min. As expected for Segment I, the filtration efficiency increased with the power supplied. Segment II shows a more extensive removal of particles collected at high power, once again indicating that the configuration of these particles within the pores makes them more susceptible to entrainment and flushing. As was the case with the unconsolidated medium, an increase in the feed concentration leads to a reduced sensitivity to power level.

EXAMPLE 8

Figure 12:
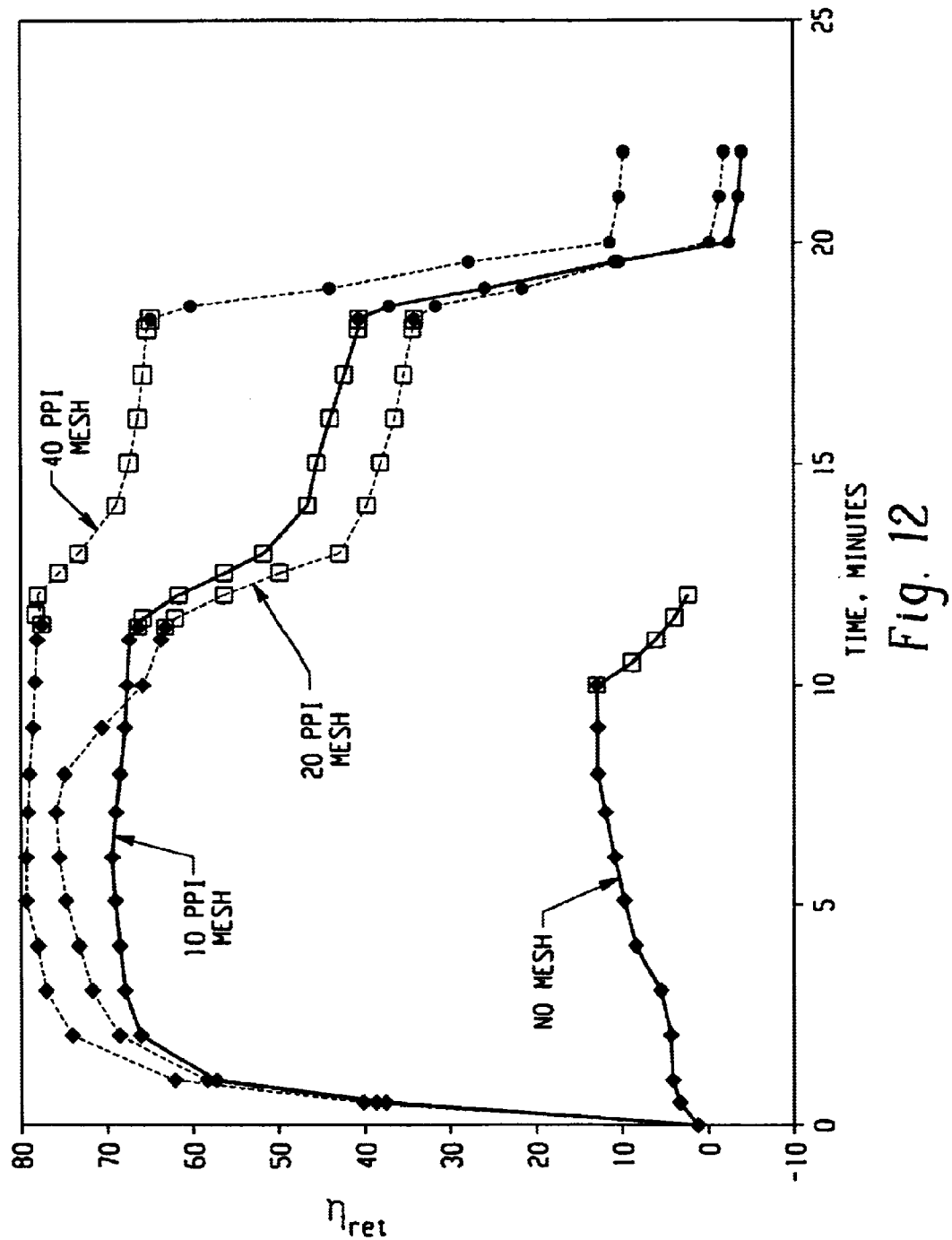

The pore size in the porous medium directly affects both the specific velocity and the internal surface area available for particle attachment. FIG. 12 shows how filtration performance is affected by pore size for a chamber operated at a fixed flow rate of 40 cm$^3$/min of 0.3 wt % feed with 20 W of power, using aluminum mesh filters with pore sizes of 10 ppi, 20 ppi, and 40 ppi. Similar results were obtained with polyester foam media having these pore sizes. In general, filtration performance improves with a decrease in pore size. Since smaller pores correspond to more internal surface area, this result suggests that, as depicted in FIG. 3(b), secondary acoustic forces may be responsible for the particle collection.

We also have shown in FIG. 12 the percent retention in the chamber obtained when there is no porous medium present between the transducer and reflector. In the absence of a porous medium, the small percentage retention observed may be attributed to radiation induced agglomeration and sedimentation of agglomerated particles due to gravity. It is clear that the presence of the porous mesh has a pronounced effect on the filtration performance.

EXAMPLE 9

Figure 13:
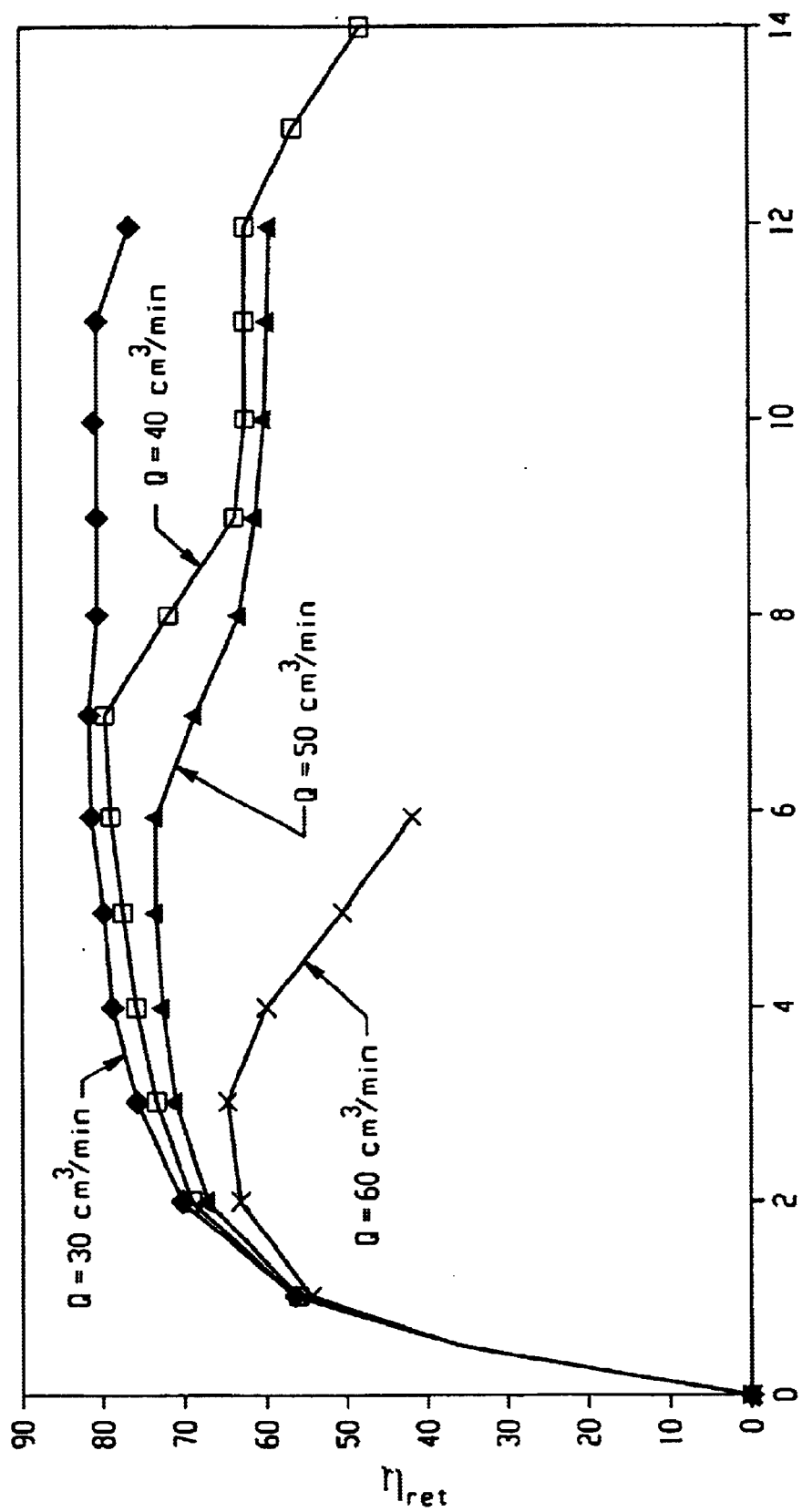

FIG. 13 shows the effect of suspension flow rate on the cumulative filtration efficiency for feeds of 0.5 wt % with the chamber filled with the 10 ppi polyester foam porous medium and the transducer driven with 20 W of power. In this example, only the results during the Segment I phase are shown. As with the glass-bead medium and the aluminum mesh, increasing the flow rate shortened the time to maximum filtration efficiency. The percentage retention at a flow rate of 30 cm$^3$/min was similar that of the 10 ppi aluminum mesh at the same flow rate (see FIG. 9). At higher flow rates, the polyester foam exhibited increased retention when compared to the aluminum mesh.

EXAMPLE 10

Figure 14:
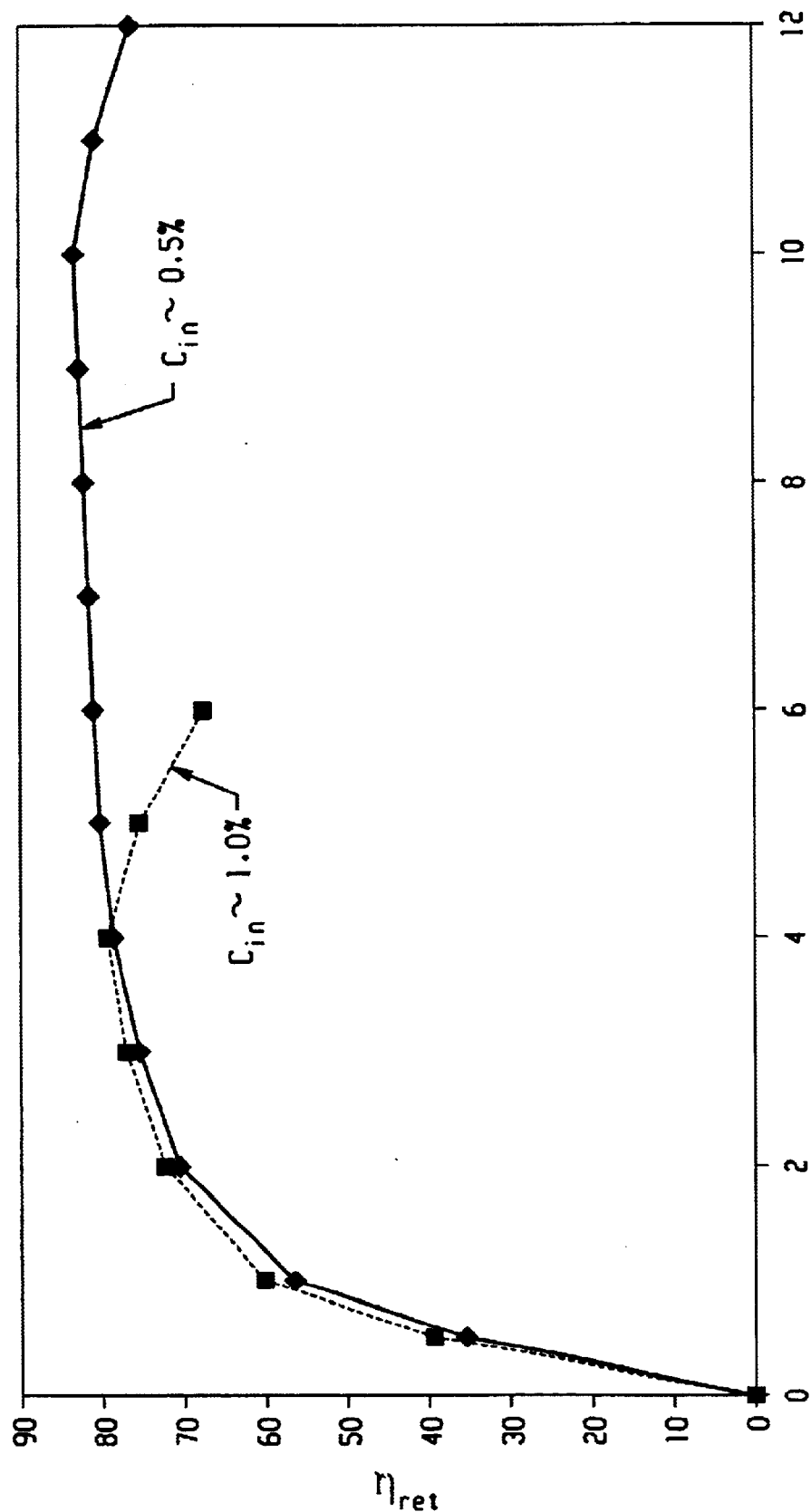

FIG. 14 shows the influence of feed concentration on filtration efficiency for a feed flow rate of 30 cm$^3$/min using a chamber equipped with the 10 ppi polyester foam porous medium and powered at 20 W. Again, only the results during Segment I are shown. There was no significant effect on filtration efficiency due to feed concentration during the first 4 minutes. After that, however, the efficiency dropped rapidly for the sample using a feed concentration of approximately 1.0 wt % but continued to rise for the sample using a feed concentration of approximately 0.5 wt %. Filtration efficiency for the test using the lower feed concentration reached a maximum at about 10 minutes.

EXAMPLE 11

Figure 15:
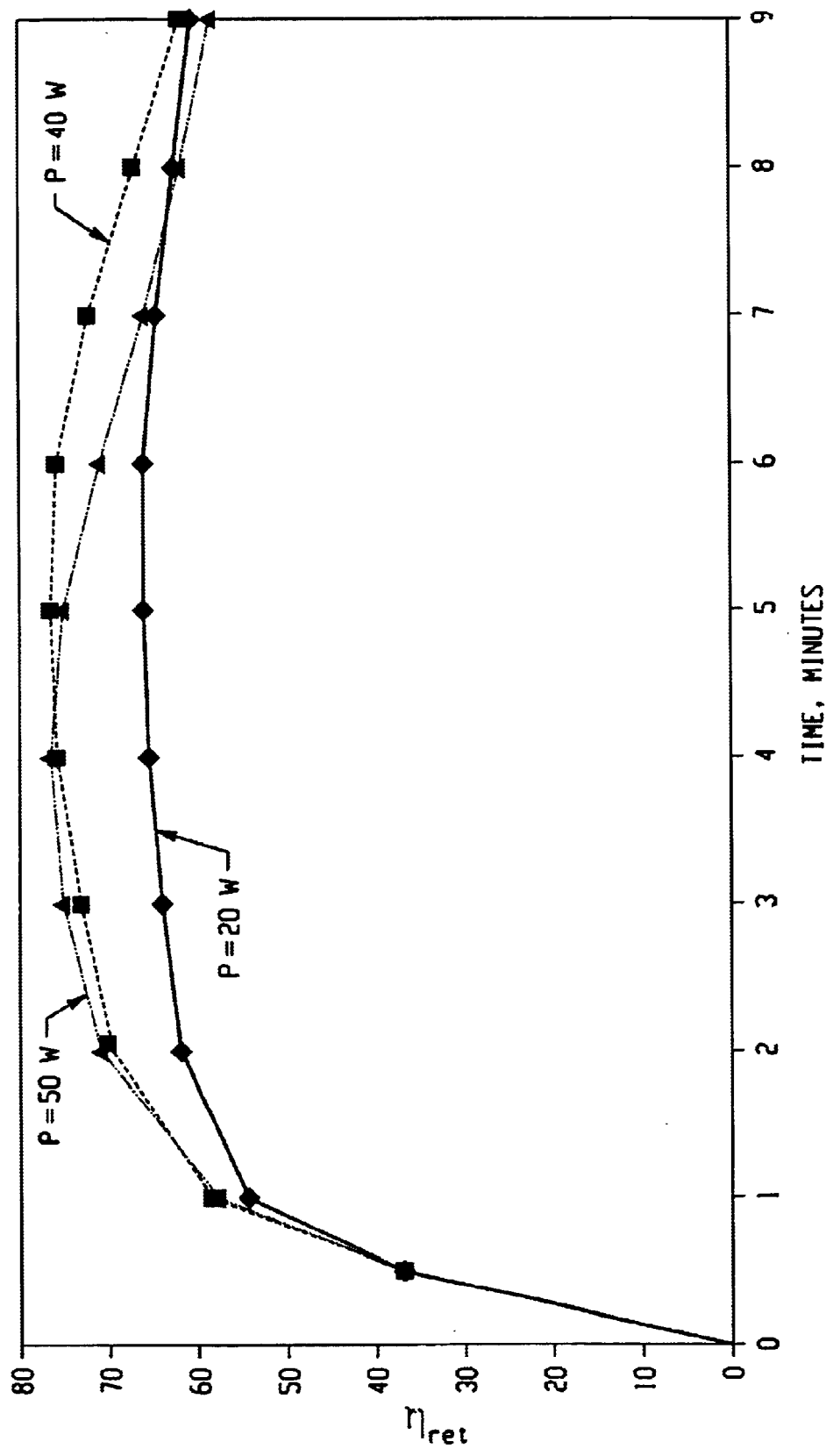

FIG. 15 is another graph showing the effect of acoustic field intensity in the acoustic chamber, again expressed in terms of electrical power supplied to the piezoelectric transducer, on the filtration performance during Segment I. In this case, the chamber was equipped with 10 ppi polyester foam, and a 0.5 wt % suspension was fed at 80 cm$^3$/min. As expected, the filtration efficiency increased with the power supplied, and the high feed concentration value shortened the time at which maximum filtration efficiency was reached.

EXAMPLE 12

Figure 16:
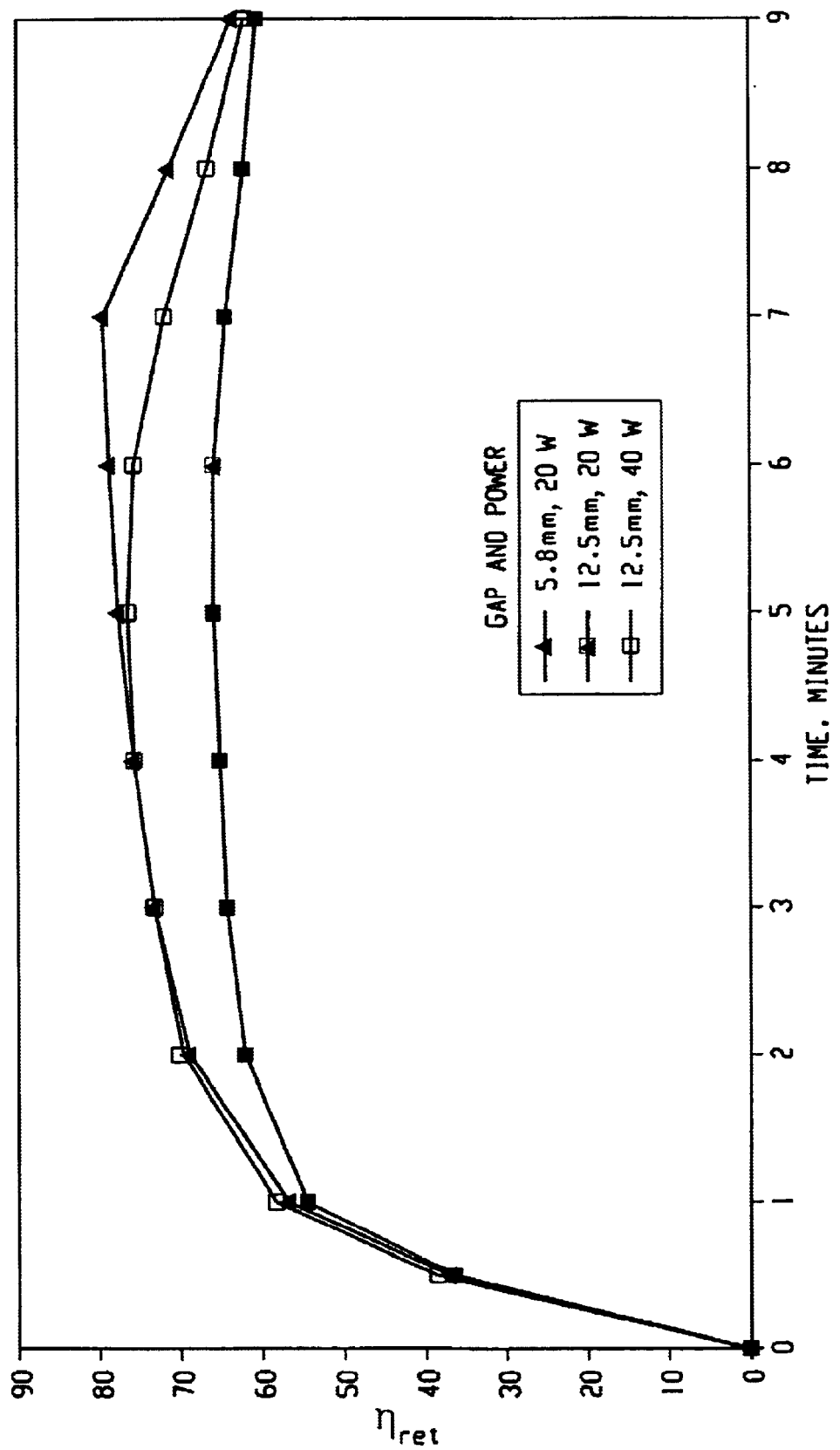

Tests were done to evaluate the effect of scaling up the method of the invention to a larger chamber. FIG. 16 is a graph showing the effect of varying size of the chamber and the resulting change in the distance or gap between the powered transducer and the reflector. First, the standard 5.8 mm deep chamber was used to establish a baseline. The chamber was filled with 10 ppi polyester foam, a 0.5 wt % suspension was fed at 40 cm$^3$/min, and the transducer was operated at 20 W. Next, a 12.5 mm deep chamber was fabricated and filled with 10 ppi polyester foam, and the feed flow was increased to 80 cm$^3$/min to keep the residence time of the suspension feed approximately the same. When this larger chamber was acoustically activated at 20 W of power, the maximum filtration efficiency dropped by about 15%. We then doubled the power fed to the transducer energizing the larger chamber (to 40 W), which resulted in restoring the filtration efficiency to a level substantially equivalent to that when the transducer was operated at 20 W in the 5.8 mm deep chamber.

EXAMPLE 13

Figure 17:
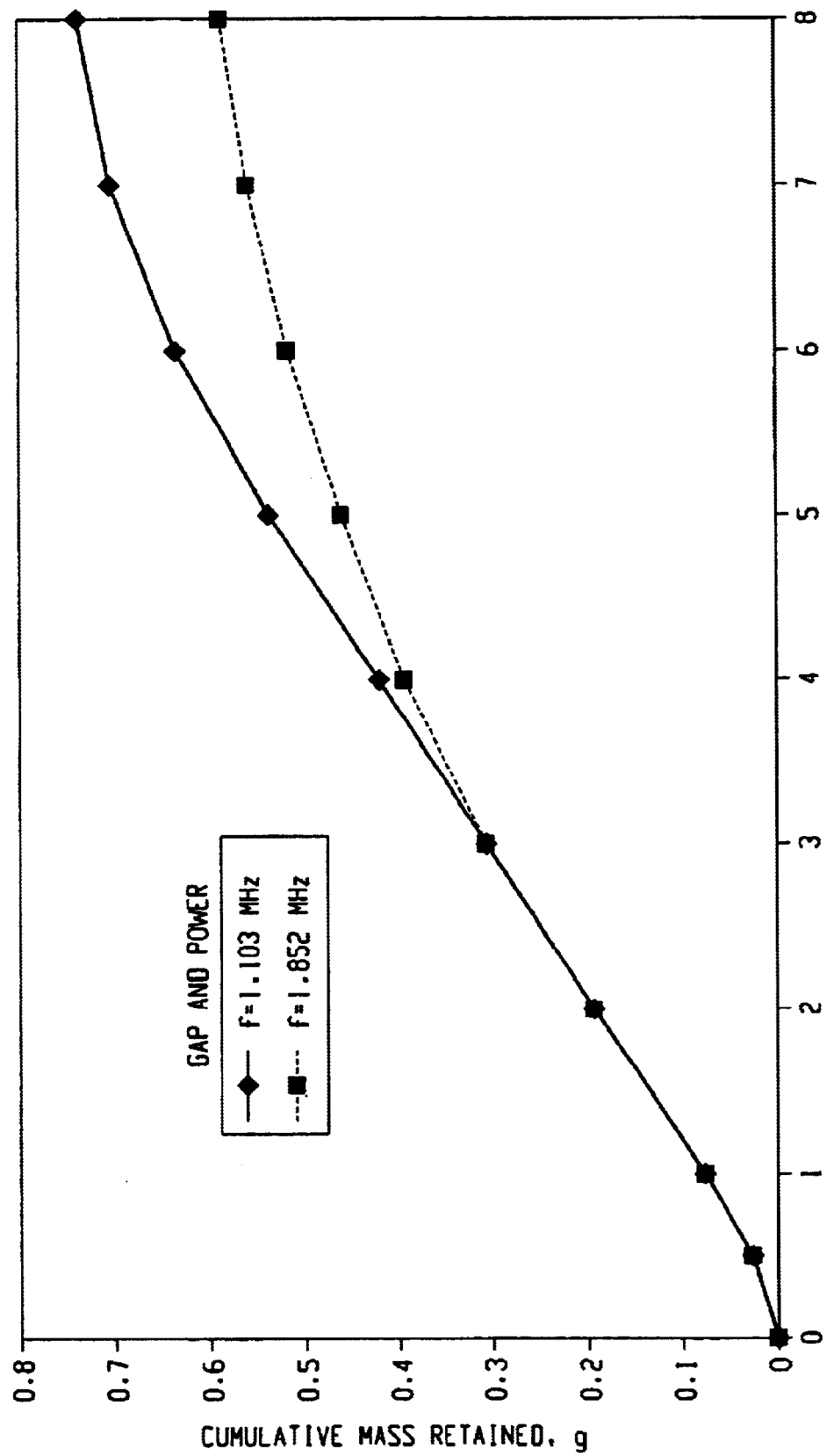

FIG. 17 is a graph of cumulative mass retention (in grams) as a function of time for two different resonant frequencies. In this case, the chamber was equipped with 10 ppi polyester foam, a 0.5 wt % suspension was fed at 30 cm$^3$/min, and the transducer was operated at 20 W of power. For the two different frequencies, the mass retention was substantially equal for the first 3 minutes of particle capture. After 3 minutes, the porous medium excited at 1.103 MHz exhibited a slightly higher retention efficiency than that excited at 1.852 MHz.

It is clear that application of resonant acoustic fields to porous media can result in their functioning as filters for particles much smaller than the pore size of the medium. Reasonable filtration efficiencies were achieved in the laboratory tests. Large fractions of particles were trapped from flowing suspension (Segment I in the experiments.) In practice, the loss of particles as the feed would be switched to clear water (Segment II) or the field deactivated (Segment III) indicates the ease with which the porous medium can be regenerated. The filtration efficiency was observed to follow the expected trends with respect to variation in suspension flow rate and acoustic field intensity. Filtration efficiency was found to be almost independent of concentration of particles in the feed suspension in the range of 0.3 to 0.5 wt %. The higher efficiencies observed for the aluminum mesh and polyester foam media relative to the glass-bead medium could be attributed to their higher porosities and the corresponding smaller interstitial velocities.

The residence time of suspensions in the active acoustic field (the volume of the active acoustic chamber divided by the volumetric flow rate of the fluid through the chamber) varied from 0.32 to 0.47 min for flow rates between 30 and 45 cm$^3$/min. In case of the unconsolidated medium, the filtration efficiency reached its maximum after 1.5 to 4 min of operation, after which it started to decrease. The corresponding durations were 5 to 8 min for the 10 ppi aluminum mesh and 6.5 to 10 min for the polyester foam (omitting the samples run at extreme conditions relative to the aluminum mesh). Thus the filtration process could be continued for about 5 residence times in the unconsolidated media, for about 16–17 residence times for the aluminum mesh, and for about 20–21 residence times for the polyester foam before losing filtration efficiency.

Separation efficiencies in excess of 90–95% have been reported in earlier resonant ultrasonic field-based filtration and fractionation. The continuous nature of operation and high efficiency makes those methods very attractive. They have operational difficulties, however, when large quantities of suspensions need to be treated. The filtration method of the present invention is much more amenable to large scale operations. Additionally, there is no need to use closely spaced physical barriers, and one should be able to achieve reasonable efficiency even in larger volumes of porous medium as long as ultrasonic fields of appropriate intensities are employed. Higher overall filtration efficiency may be achieved by using multiple stages.

It will be apparent to those skilled in the art that other modifications and variations can be made in the method of and apparatus of the invention without departing from the scope of the invention. For example, mesh and foam filters formed from materials other than aluminum or polyester can be used as the porous medium. Similarly, unconsolidated porous media can be produced using solids other than glass spheres, such as Raschig rings, Berl Saddles, and other shapes. In addition, although the examples set forth above exhibit acoustically enhanced filtration when the frequency of the acoustic field was resonant to the chamber filled with liquid but without the porous medium, it is to be expected that the method of the invention also will operate at frequencies resonant to the liquid-filled chamber with the porous medium present. The invention in its broader aspects is, therefore, not limited to the specific details and illustrated examples shown and described. Accordingly, it is intended that the present invention cover such modifications and variations provided that they fall within the scope of the appended claims and their equivalents.

We claim:

1. An apparatus for separating particles from a fluid, comprising:
   a. a chamber having an inlet and an outlet;
   b. a porous medium disposed within said chamber between said inlet and said outlet, said porous medium having a predetermined average pore size
   c. means connected to said inlet for flowing through said chamber and said porous medium a fluid containing particles,
   d. means for imposing on said porous medium an acoustic field while the fluid is flowed through said porous medium, said porous medium trapping particles having a size substantially less than its predetermined average pore size while the acoustic field is imposed; and
   e. means for detecting when a predetermined optimum trapping condition exists and, in response to the optimum trapping condition, removing the acoustic field to permit particles trapped in said porous medium to flow through said porous medium and out said outlet of said chamber.

2. The apparatus of claim 1, wherein said detecting means comprises a photometer that detects the particle concentration of the fluid flowing out of said outlet.

3. The apparatus of claim 1, further comprising means for connecting said outlet of said chamber to a particle-collection conduit in response to the optimum trapping condition.

* * * * *